US012048077B2

(12) United States Patent

Miskin et al.

(10) Patent No.: US 12,048,077 B2

(45) Date of Patent: *Jul. 23, 2024

(54) LED LIGHTING SYSTEM

(71) Applicant: Lynk Labs, Inc., Elgin, IL (US)

(72) Inventors: Michael Miskin, Sleepy Hollow, IL (US); Robert L. Kottritsch, Shefford Bedfordshire (GB)

(73) Assignee: Lynk Labs, Inc., Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,580

(22) Filed: Jun. 12, 2023

(65) Prior Publication Data

US 2023/0328862 A1 Oct. 12, 2023

Related U.S. Application Data

(60) Continuation of application No. 17/157,264, filed on Jan. 25, 2021, now Pat. No. 11,678,420, which is a continuation of application No. 16/872,049, filed on May 11, 2020, now Pat. No. 10,904,967, which is a continuation of application No. 16/693,155, filed on Nov. 22, 2019, now Pat. No. 10,652,979, which is a (Continued)

(51) Int. Cl.

| | |
|---|---|
| ***H05B 45/50*** | (2022.01) |
| ***H05B 45/00*** | (2022.01) |
| ***H05B 45/10*** | (2020.01) |
| ***H05B 45/30*** | (2020.01) |
| ***H05B 45/37*** | (2020.01) |
| ***H05B 45/40*** | (2020.01) |
| ***H05B 45/42*** | (2020.01) |

(52) U.S. Cl.

CPC ............ *H05B 45/50* (2020.01); *H05B 45/00* (2020.01); *H05B 45/10* (2020.01); *H05B 45/30* (2020.01); *H05B 45/37* (2020.01); *H05B 45/40* (2020.01); *H05B 45/42* (2020.01)

(58) Field of Classification Search

None

See application file for complete search history.

(56) References Cited

U.S. PATENT DOCUMENTS 11,678,420 B2 * 6/2023 Miskin .................. H05B 45/10 315/185 R

OTHER PUBLICATIONS

*Samsung Electronics Co., Ltd.*, Petitioner v. *Lynk Labs, Inc.* Patent Owner IPR 2022-00098 U.S. Pat. No. 10,517,149 B2 Judgment Final Written Decision Determining Some Challenged Claims Unpatentable 35 U.S.C Section 318(a) Paper 29 entered May 5, 2023 46 pages.

(Continued)

*Primary Examiner* — Anh Q Tran

(74) *Attorney, Agent, or Firm* — K&L Gates LLP

(57) ABSTRACT

A lighting device is disclosed. An example lighting device includes at least one light emitting diode ("LED") circuit having a plurality of LEDs, where the plurality of LEDs includes the same or differently colored LEDs. The lighting device also includes a driver including at least one bridge rectifier, a housing including a reflective material or coating, and a power source adapter. The driver receives an AC voltage from the power source adaptor and provides an output voltage to the at least one LED circuit. The lighting device also includes a circuit configured to electrically decouple the driver after detecting the output voltage of the driver is outside a predetermined voltage range.

20 Claims, 23 Drawing Sheets

Related U.S. Application Data continuation of application No. 16/508,053, filed on Jul. 10, 2019, now Pat. No. 10,555,385, which is a continuation of application No. 16/407,044, filed on May 8, 2019, now Pat. No. 10,492,260, which is a continuation of application No. 16/102,603, filed on Aug. 13, 2018, now Pat. No. 10,334,680, which is a continuation of application No. 15/477,702, filed on Apr. 3, 2017, now Pat. No. 10,051,703, which is a continuation of application No. 14/948,635, filed on Nov. 23, 2015, now Pat. No. 9,615,420, which is a division of application No. 13/697,646, filed as application No. PCT/US2011/036359 on May 12, 2011, now Pat. No. 9,198,237, which is a continuation-in-part of application No. PCT/US2010/062235, filed on Dec. 28, 2010, which is a continuation-in-part of application No. 12/287,267, filed on Oct. 6, 2008, now Pat. No. 8,179,055, said application No. 14/948,635 is a continuation-in-part of application No. 12/364,890, filed on Feb. 3, 2009, now Pat. No. 8,148,905, which is a continuation of application No. 11/066,414, filed on Feb. 25, 2005, now Pat. No. 7,489,086, said application No. PCT/US2011/036359 is a continuation-in-part of application No. PCT/US2010/001597, filed on May 28, 2010, which is a continuation-in-part of application No. 12/287,267, filed on Oct. 6, 2008, now Pat. No. 8,179,055, said application No. PCT/US2010/062235 is a continuation-in-part of application No. PCT/US2010/001269, filed on Apr. 30, 2010, which is a continuation-in-part of application No. 12/287,267, filed on Oct. 6, 2008, now Pat. No. 8,179,055.

(60) Provisional application No. 61/333,963, filed on May 12, 2010, provisional application No. 61/335,069, filed on Dec. 31, 2009, provisional application No. 61/284,927, filed on Dec. 28, 2009, provisional application No. 60/997,771, filed on Oct. 6, 2007, provisional application No. 60/559,867, filed on Apr. 6, 2004, provisional application No. 60/547,653, filed on Feb. 25, 2004.

(56) References Cited

OTHER PUBLICATIONS

*Samsung Electronics Co., Ltd.*, Petitioner v. *Lynk Labs, Inc.* Patent Owner IPR 2022-00101, U.S. Pat. No. 10,750,583 B2 Judgment Final Written Decision Determining No Challenged Claims Unpatentable 35 U.S.C Section 318(a) Paper 30 entered May 25, 2023—34 pages.

*Samsung Electronics Co., Ltd.*, Petitioner v. *Lynk Labs, Inc.* Patent Owner IPR 2022-00100, U.S. Pat. No. 10,750,583 B2 Judgment Final Written Decision Determining All Challenged Claims Unpatentable 35 U.S.C Section 318(a) Paper 30 entered Jun. 7, 2023—42 pages.

*Samsung Electronics Co., Ltd.*, Petitioner v. *Lynk Labs, Inc.* Patent Owner IPR 2022-00051, U.S. Pat. No. 10,492,251 B2 Judgment Final Written Decision Determining All Challenged Claims Unpatentable 35 U.S.C Section 318(a) Paper 37 entered Jun. 2, 2023—22 pages.

*Home Depot U.S.A., Inc.*, Petitioner v. *Lynk Labs, Inc.* Patent Owner PGR2022-00009, U.S. Pat. No. 10,932,341 B2 Judgment Final Written Decision Determining All Challenged Claims Unpatentable Paper 38 entered May 22, 2023—79 pages.

*Samsung Electronics Co., Ltd.*, Petitioner v. *Lynk Labs, Inc.* Patent Owner IPR2022-00052, U.S. Pat. No. 10,492,251 B2 Judgment Final Written Decision Determining All Challenged Claims Unpatentable 35 U.S.C.Section 318(a) Paper 38 entered Jun. 2, 2023—37 pages.

*Samsung Electronics Co., Ltd.*, Petitioner v. *Lynk Labs, Inc.*, Patent Owner IPR2022-00149, U.S. Pat. No. 10,687,400 B2 Judgment Final Written Decision Determining All Challenged Claims Unpatentable 35 U.S.C. Section 314(a) Paper 33 dated Jun. 26, 2023—70 pages.

*Samsung Electronics Co. Ltd.*, Petitioner v. *Lynk Labs, Inc.*, Patent Owner IPR2021-01575, U.S. Pat. No. 10, 154,551 B2 Judgment Final Written Decision Determining All Challenged Claims Unpatentable 35 U.S.C. Section 318(a) Paper 38 dated May 10, 2023—42 pages.

* cited by examiner

120/240 VAC SINGLE CHIP

2-WAY SINGLE CHIP AC LED FOR 2-WAY LAMP

2-WAY SINGLE CHIP 12V AC LED FOR 2-WAY LAMP

LED LIGHTING SYSTEM

PRIORITY CLAIM

The present application is a continuation of U.S. patent application Ser. No. 17/157,264, filed Jan. 25, 2021, which is a continuation of U.S. patent application Ser. No. 16/872,049, filed May 11, 2020, which is a continuation of U.S. patent application Ser. No. 16/693,155, filed Nov. 22, 2019, which is a continuation of U.S. patent application Ser. No. 16/508,053, filed Jul. 10, 2019, which is a continuation of U.S. patent application Ser. No. 16/407,044, filed May 8, 2019, which is a continuation of U.S. patent application Ser. No. 16/102,603, filed Aug. 13, 2018, which is a continuation of U.S. patent application Ser. No. 15/477,702, filed Apr. 3, 2017, which is a continuation of U.S. patent application Ser. No. 14/948,635, filed Nov. 23, 2015, which is a divisional application of U.S. patent application Ser. No. 13/697,646, filed Nov. 13, 2012, which is a 371 National Phase Application of International Application No. PCT/US2011/036359, filed May 12, 2011, which claims priority to U.S. Provisional Application No. 61/333,963, filed May 12, 2010 and is a continuation-in-part of International Application No. PCT/US2010/062235, filed Dec. 28, 2010, which claims priority to U.S. Provisional Application No. 61/284,927, filed Dec. 28, 2009 and U.S. Provisional Application No. 61/335,069, filed Dec. 31, 2009 and is a continuation-in-part of U.S. patent application Ser. No. 12/287,267, filed Oct. 6, 2008, which claims priority to U.S. Provisional Application No. 60/997,771, filed Oct. 6, 2007; U.S. patent application Ser. No. 14/948,635 is also a continuation-in-part of U.S. patent application Ser. No. 12/364,890, filed Feb. 3, 2009, which is a continuation of U.S. application Ser. No. 11/066,414 (now U.S. Pat. No. 7,489,086) filed Feb. 25, 2005, which claims priority to U.S. Provisional Application No. 60/547,653 filed Feb. 25, 2004 and U.S. Provisional Application No. 60/559,867 filed Apr. 6, 2004; International Application No. PCT/US2011/0363359 is a continuation-in-part of International Application No. PCT/US2010/001597 filed May 28, 2010 which is a continuation-in-part of U.S. application Ser. No. 12/287,267, and claims priority to U.S. Provisional Application No. 61/217,215, filed May 28, 2009; International. Application No. PCT/US2010/062235 is a continuation-in-part of International Application No. PCT/US2010/001269, filed Apr. 30, 2010, which is a continuation-in-part of U.S. application Ser. No. 12/287,267, and claims priority to U.S. Provisional Application No. 61/215,144, filed May 1, 2009; the contents of each of these applications are expressly incorporated herein by reference.

TECHNICAL FIELD

The present invention relates to an LED lighting system having multiple circuits or drivers capable of providing an output to at least one LED circuit.

FEDERALLY SPONSORED RESEARCH OR DEVELOPMENT

None.

BACKGROUND OF THE INVENTION

Description of the Related Art

LEDs are semiconductor devices that produce light when a current is supplied to them. LEDs are intrinsically DC devices that only pass current in one polarity and historically have been driven by DC voltage sources using resistors, current regulators and voltage regulators to limit the voltage and current delivered to the LED, Some LEDs have resistors built into the LED package providing a higher voltage LED typically driven with 5V DC or 12V DC.

Some standard AC voltages in the world include 12 VAC, 24 VAC, 100 VAC, 110 VAC, 120 VAC, 220 VAC, 230 VAC, 240 VAC and 277 VAC. Therefore, it would be advantageous to have a single chip LED or multi-chip single LED packages and/or devices that could be easily configured to operate at multiple voltage levels and/or multiple brightness levels by simply selecting a voltage and/or current level when packaging the multi-voltage and/or multi-current single chip LEDs or by selecting a specific voltage and/or current level when integrating the LED package onto a printed circuit board or within a finished lighting product. It would also be advantageous to have multi-current LED chips and/or packages for LED lamp applications in order to provide a means of increasing brightness in LED lamps by switching in additional circuits just as additional filaments are switched in for standard incandescent lamps.

U.S. Pat. No. 7,525,248 discloses a chip-scale LED lamp including discrete LEDs capable of being built upon electrically insulative, electrically conductive, or electrically semi conductive substrates. Further, the construction of the LED lamp enables the lamp to be configured for high voltage AC or DC power operation. The LED based solid-state light emitting device or lamp is built upon an electrically insulating layer that has been formed onto a support surface of a substrate. Specifically, the insulating layer may be epitaxially grown onto the substrate, followed by an LED buildup of an n-type semiconductor layer, an optically active layer, and a p-type semiconductor layer, in succession. Isolated mesa structure of individual, discrete LEDs are formed by etching specific portions of the LED buildup down to the insulating layer, thereby forming trenches between adjacent LEDs. Thereafter, the individual LEDs are electrically coupled together through conductive elements or traces being deposited for connecting the n-type layer of one LED and the p-type layer of an adjacent LED, continuing across all of the LEDs to form the solid-state light emitting device. The device may therefore be formed as an integrated AC/DC light emitter with a positive and negative lead for supplied electrical power. For instance, the LED lamp may be configured for powering by high voltage DC power (e.g., 12V, 24V, etc.) or high voltage AC power (e.g., 110/120V, 220/240V, etc.).

U.S. Pat. No. 7,213,942 discloses a single-chip LED device through the use of integrated circuit technology, which can be used for standard high AC voltage (110 volts for North America, and 220 volts for Europe, Asia, etc.) operation. The single-chip AC LED device integrates many smaller LEDs, which are connected in series. The integration is done during the LED fabrication process and the final product is a single-chip device that can be plugged directly into house or building power outlets or directly screwed into incandescent lamp sockets that are powered by standard AC voltages. The series connected smaller LEDs are patterned by photolithography, etching (such as plasma dry etching), and metallization on a single chip. The electrical insulation between small LEDs within a single-chip is achieved by etching light emitting materials into the insulating substrate so that no light emitting material is present between small LEDs. The voltage crossing each one of the small LEDs is about the same as that in a conventional DC operating LED fabricated from the same type of material (e.g., about 3.5 volts for blue LEDs).

Accordingly, single chip LEDs have been limited and have not been integrated circuits beyond being fixed series, fixed parallel or series parallel circuit configurations until the development of AC LEDs. The AC LEDs have still however been single circuit or parallel circuit fixed single voltage designs.

LED packages have historically not been integrated circuits beyond being fixed series, fixed parallel or fixed series parallel LED circuit configurations.

The art is deficient in that it does not provide a multi-voltage and/or multi-current circuit monolithically integrated on a single substrate which would be advantageous.

It would further be advantageous to have a multi-voltage and/or multi-brightness circuit that can provide options in voltage level, brightness level and/or AC or DC powering input power preference.

It would further be advantageous to provide multiple voltage level and/or multiple brightness level light emitting LED circuits, chips, packages and lamps "multi-voltage and/or multi-brightness LED devices" that can easily be electrically configured for at least two forward voltage drive levels with direct AC voltage coupling, bridge rectified AC voltage coupling or constant voltage DC power source coupling. For example, it would be advantageous to provide a device that can be driven with more than one AC or DC forward voltage "multi-voltage" at 6V or greater based on a selectable desired operating voltage level that is achieved by electrically connecting the LED circuits in a series or parallel circuit configuration and/or more than one level of brightness "multi-brightness" based on a switching means that connects and/or disconnects at least one additional LED circuit to and/or from a first LED circuit. It would be advantageous if the desired operating voltage level and/or the desired brightness level electrical connection was achieved and/or completed at the LED packaging level when the multi-voltage and/or multi-brightness circuits and/or single chips are integrated into the LED package, or the LED package may have external electrical contacts that match the integrated multi-voltage and/or multi-brightness circuits and/or single chips within, allowing the drive voltage level and/or the brightness level select-ability to be passed on through to the exterior of the LED package and allowing the voltage level or brightness level to be selected at the LED package user, or the PCB assembly facility, or the end product manufacturer.

It would further be advantageous to provide at least two integrated circuits having a forward voltage of at least 12 VAC or 12 VDC or greater on a single chip or within a single LED package that provide a means of selecting a forward voltage when packaging a multi-voltage and/or multi-brightness circuit using discrete die (one LED chip at a time) and wire bonding them into a circuit at the packaging level or when packaging one or more multi-voltage and/or multi-brightness level single chips within a LED package.

It would further be advantageous to provide multi-voltage and/or multi-brightness level devices that can provide electrical connection options for either AC or DC voltage operation at preset forward voltage levels of 6V or greater.

It would further be advantageous to provide multi-brightness LED devices that can be switched to different levels of brightness by simply switching additional circuits on or off in addition to a first operating circuit within a single chip and or LED package. This would allow LED lamps to switch to higher brightness levels just like 2-way or 3-way incandescent lamps do today.

The benefits of providing multi-voltage circuits of 6V or greater on a single chip is that an LED packager can use this single chip as a platform to offer more than one LED packaged product with a single Chip that addresses multiple voltage levels for various end customer design requirements. This would also increase production on a single product for the chip maker and improves inventory control. This also improves buying power and inventory control for the LED packager when using one chip.

It would further be advantageous to have a LED lighting assembly which includes LED circuitry for AC or DC drive and a high frequency AC voltage transformer or inverter that could be used to convert low frequency voltages, like for example mains voltage or some other low voltage at 50/60 Hz, to a high frequency without a change in the voltage provided. For example, it would be advantageous to have a LED lighting power supply and/or driver capable of receiving 120 VAC at 60 Hz and be able to provide a high frequency AC output directly to an AC driven LED circuit(s), or alternatively to a DC driven LED circuit(s) through an AC-to-DC rectifier at a voltage equal to or different from the original input voltage to the power supply and/or driver.

It would be further advantageous to combine multiple-voltage LED chips, packages, circuits, lamps, etc., high frequency AC voltage power supplies and/or transformers to drive LEDs by either directly connecting a high frequency transformer or inverter to an AC driven LED circuit(s), or by operably connecting an AC-to-DC rectifier between the high frequency transformer or inveter and a DC driven LED circuit. With proper design considerations LEDs may be driven more efficiently with direct AC or rectified AC than with constant voltage or constant current DC drive schemes. High frequency AC transformers or inverters can be made smaller and more cost effective than constant current or constant voltage DC drivers or power supplies currently being used to power LEDs. The higher the frequency, the smaller the transformer can be made. With proper design consideration and based on the wattage and the frequency of the AC voltage output of the power supply, a high frequency AC voltage transformer can be made small enough to be mounted directly onto a LED lighting PCB assembly.

It would be further advantageous to provide an LED lighting system capable of operating after a circuit or driver through which power is supplied to LEDs fails.

The present invention provides for these advantages and solves the deficiencies in the art.

SUMMARY OF THE INVENTION

According to one aspect of the invention at least two single voltage AC LED circuits are formed on a single chip or on a substrate providing a multi-voltage AC LED device for direct AC power operation. Each single voltage AC LED circuit has at least two LEDs connected to each other in opposing parallel relation.

According to another aspect of the invention, each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit.

According to another aspect of the invention, each multi-voltage AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. By way of example, the second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention, at least two single voltage series LED circuits, each of which have at least two serially connected LEDs, are formed on a single chip or on a substrate providing a multi-voltage AC or DC operable LED device.

According to another aspect of the invention, each single voltage series LED circuit is designed to be driven with a predetermined forward voltage of at least 6V AC or DC and preferably each single voltage series LED circuit has a matching forward voltage of 6V, 12V, 24V, 120V, or other AC or DC voltage levels. By way of example, each multi-voltage AC or DC LED device would be able to be driven with at least two different AC or DC forward voltages resulting in a first forward voltage drive level by electrically connecting the two single voltage series LED circuits in parallel and a second forward voltage drive level by electrically connecting the at least two single voltage level series LED circuits in series. The second forward voltage drive level of the serially connected series LED circuits would be approximately twice the level of the first forward voltage drive level of the parallel connected series LED circuits. The at least two parallel connected series LED circuits would be twice the current of the at least two serially connected series LED circuits. In either circuit configuration, the brightness would be approximately the same with either forward voltage drive selection of the multi-voltage series LED device.

According to another aspect of the invention, at least two single voltage AC LED circuits are formed on a single chip or on a substrate providing a multi-voltage and/or multi-brightness AC LED device for direct AC power operation.

According to another aspect of the invention, each single voltage AC LED circuit has at least two LEDs connected to each other in opposing parallel relation. Each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit. The at least two AC LED circuits within each multi-voltage and/or multi current AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. The second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention at least two single voltage LED circuits are formed on a single chip or on a substrate, and at least one bridge circuit made of LEDs is formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VAC, 24 VAC, 120 VAC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate, and at least one bridge circuit made of standard diodes, LEDs or some combination thereof is provided separate of the LED circuit or formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention a multi-voltage and/or multi-current AC LED circuit is integrated within a single chip LED. Each multi-voltage and/or multi-current single chip AC LED comprises at least two single voltage AC LED circuits. Each single voltage AC LED circuit has at least two LEDs in anti-parallel configuration to accommodate direct AC voltage operation. Each single voltage AC LED circuit may have may have at least one voltage input electrical contact at each opposing end of the circuit or the at least two single voltage AC LED circuits may be electrically connected together in series on the single chip and have at least one voltage input electrical contact at each opposing end of the two series connected single voltage AC LED circuits and one voltage input electrical contact at the center junction of the at least two single voltage AC LED circuits connected in series. The at least two single voltage AC LED circuits are integrated within a single chip to form a multi-voltage and/or multi-current single chip AC LED.

According to another aspect of the invention, at least one multi-voltage and/or multi-brightness LED devices may be integrated within a LED lamp. The at least two individual LED circuits within the multi-voltage and/or multi-brightness LED device(s) may be wired in a series or parallel circuit configuration by the LED packager during the LED packaging process thus providing for at least two forward voltage drive options, for example 12 VAC and 24 VAC or 120 VAC and 240 VAC that can be selected by the LED packager.

According to another aspect of the invention a multi-voltage and/or multi-current AC LED package is provided, comprising at least one multi-voltage and/or multi-current single chip AC LED integrated within a LED package. The multi-voltage and/or multi-current AC LED package provides matching electrical connectivity pads on the exterior of the LED package to the electrical connectivity pads of the at least one multi-voltage and/or multi-current single chip AC LED integrated within the LED package thus allowing the LED package user to wire the multi-voltage and/or multi-current AC LED package into a series or parallel circuit configuration during the PCB assembly process or final product integration process and further providing a AC LED package with at least two forward voltage drive options.

According to another aspect of the invention multiple individual discrete LED chips are used to form at least one multi-voltage and/or multi-current AC LED circuit within a LED package thus providing a multi-voltage and/or multi current AC LED package. Each multi-voltage and/or multi-current AC LED circuit within the package comprises at least two single voltage AC LED circuits. Each single voltage AC LED circuit has at least two LEDs in anti-parallel configuration to accommodate direct AC voltage operation The LED package provides electrical connectivity pads on the exterior of the LED package that match the electrical connectivity pads of the at least two single voltage AC LED circuits integrated within the multi-voltage and/or multi-current AC LED package thus allowing the LED package to be wired into a series or parallel circuit configuration during the PCB assembly process and further providing a LED package with at least two forward voltage drive options.

According to another aspect of the invention a multi-voltage and/or multi-current single chip AC LED and/or multi-voltage and/or multi current AC LED package is integrated within an LED lamp. The LED lamp having a structure that comprises a heat sink, a lens cover and a standard lamp electrical base. The multi-voltage and/or multi-current single chip AC LED and/or package is configured to provide a means of switching on at least one additional single voltage AC LED circuit within multi-voltage and/or multi-current AC LED circuit to provide increased brightness from the LED lamp.

According to anther broad aspect of the invention at least one multi-current AC LED single chip is integrated within a LED package.

According to another aspect of the invention, at least one single chip multi-current bridge circuit having standard diodes, LEDs, or some combination thereof is integrated within a LED lamp having a standard lamp base. The single chip multi-current bridge circuit may be electrically connected together in parallel configuration but left open to accommodate switching on a switch to the more than one on the single chip and have at least one accessible electrical contact at each opposing end of the two series connected circuits and one accessible electrical contact at the center junction of the at least two individual serially connected LED circuits. The at least two individual circuits are integrated within a single chip.

According to another aspect of the invention when the at least two circuits are left unconnected on the single chip and provide electrical pads for connectivity during the packaging process, the LED packager may wire them into series or parallel connection based on the desired voltage level specification of the end LED package product offering.

According to another aspect of the invention, a high frequency transformer or inverter may provide power to at least one multi-voltage and/or multi-brightness LED device or chip. The high frequency transformer or inverter may be either packaged with the LED device or chip and may provide direct AC voltage to the LED device or chip, or as a separate driver or power supply for the LED device or chip capable of being electrically connected to the LED device or chip. The high frequency transformer or inverter is designed to receive a voltage at a low frequency, like for example a voltage at 50/60 Hz like a mains voltage, and output a voltage at a high frequency. The high frequency transformer or inverter may also be configured to step-up or step-down the voltage provided to the transformer or inverter from a source voltage.

According to another aspect of the invention, a high-frequency transformer or inverter may provide power to a DC driven-LED circuit, chip, or device or an LED circuit, chip or device containing one or more series strings of LEDs through a rectifier having standard diodes, LEDs, or some combination thereof may be electrically connected between the high-frequency transformer or inverter and. The rectifier may be provided independently from the high-frequency transformer or inverter and the LED circuit, chip, or device and electrically connected at its input to the high-frequency transformer or inverter and at its output to the LED circuit, chip or device. Alternatively, the rectifier may be packaged with the high-frequency transformer or inverter forming a power supply or driver for the LED circuit, chip, or device. The rectifier may likewise be packaged directly with, or as part of, an LED circuit, chip, or device. As should be appreciated by those having skill in the art, packaging the rectifier directly with the LED circuit, chip, or device allows for an LED package containing a DC-driven LED circuit, chip, or device, or one or more series strings of LEDs, to be directly plugged into any power supply or driver providing an AC voltage output and operate. As a further alternative, a high-frequency inverter, rectifier, and LED circuit, chip, or device may be packaged into a single lighting device capable of being directly incorporated into a lighting element, or may be incorporated directly into a lamp or other OEM product utilizing LED light.

According to another aspect of the invention, a two-way or three-way switch may be provided directly between a high-frequency inverter providing power to a LED circuits, chip, or device and the LED circuits, chip or device, or in the alternative between a LED circuits, chip, or device and a rectifier having standard diodes, LEDs, or some combination thereof electrically connected to a high-frequency transformer or inverter.

According to another aspect of the invention, an LED lighting system having multiple circuits or drivers capable of receiving an AC voltage input at a first frequency, like for example a mains input, and providing an output capable of driving at least one LED circuit is provided. The LED lighting system includes a sensor capable of sensing the output of each circuit or driver capable of driving the LED circuit, and permitting only a single output to be provided. The sensor may be further capable of switching between circuits or drivers capable of driving the LED circuit if any circuit or driver currently being utilized fails.

Other aspects and features of the invention will become apparent to those having ordinary skill in the art upon review of the following Description, Claims, and associated Drawings.

DETAILED DESCRIPTION OF PREFERRED EMBODIMENTS

Figure 2:
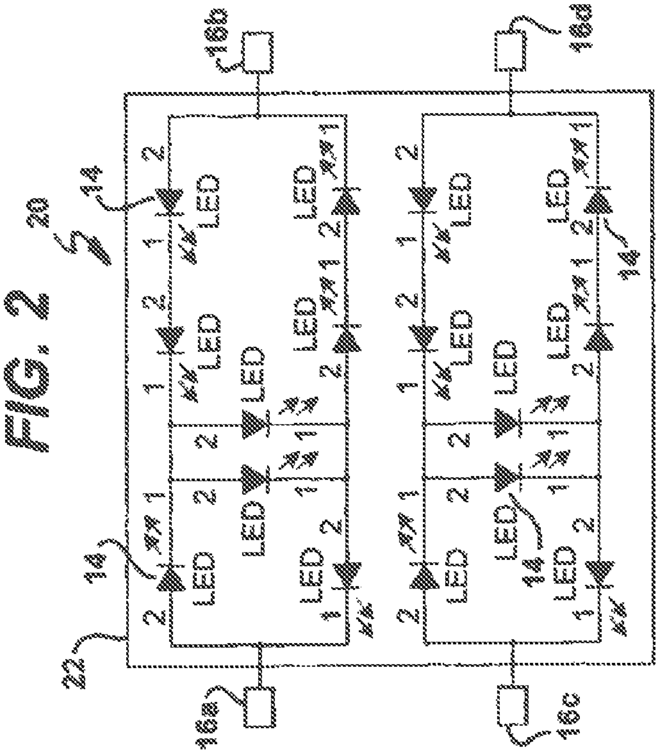
FIG. 2 shows a schematic view of a preferred embodiment of the invention.

While the present invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
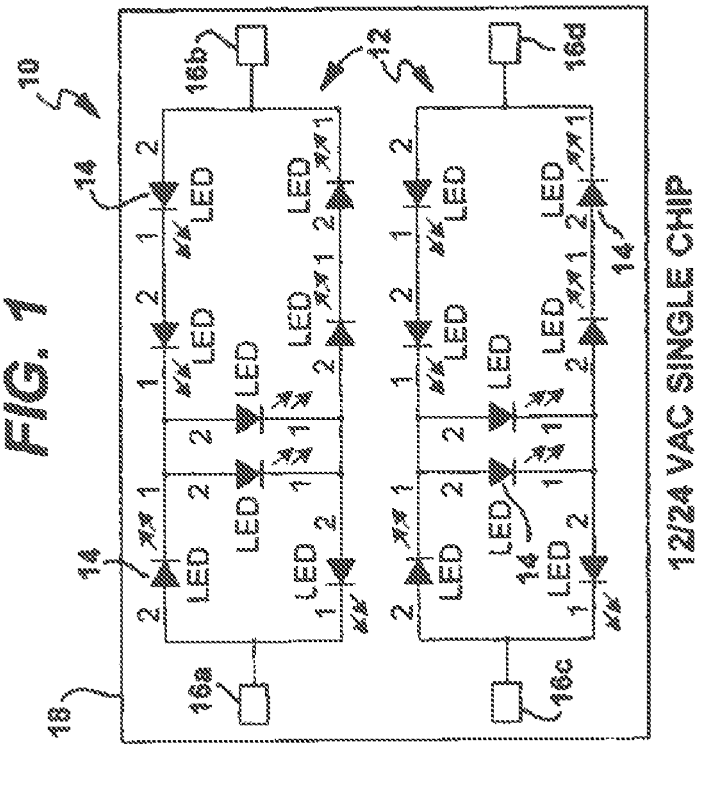
FIG. 1 shows a schematic view of a preferred embodiment of the invention.

FIG. 1 discloses a schematic diagram of a multi-voltage and/or multi-brightness LED lighting device 10. The multi-voltage and/or multi-brightness LED lighting device 10 comprises at least two AC LED circuits 12 configured in an imbalanced bridge circuit, each of which have at least two LEDs 14. The at least two AC LED circuits have electrical contacts 16*a*, 16*b*, 16*c*, and 16*d* at opposing ends to provide various connectivity options for an AC voltage source input. For example, if 16*a* and 16*c* are electrically connected together and 16*b* and 16*d* are electrically connected together and one side of the AC voltage input is applied to 16*a* and 16*c* and the other side of the AC voltage input is applied to 16*b* and 16*d*, the circuit becomes a parallel circuit with a first operating forward voltage. If only 16*a* and 16*c* are electrically connected and the AC voltage inputs are applied to electrical contacts 16*b* and 16*d*, a second operating forward voltage is required to drive the single chip 18. The single chip 18 may also be configured to operate at more than one brightness level "multi-brightness" by electrically connecting for example 16*a* and 16*b* and applying one side of the line of an AC voltage source to 16*a* ad 16*b* and individually applying the other side of the line from the AC voltage source a second voltage to 26*b* and 26*c*.

FIG. 2 discloses a schematic diagram of a multi-voltage and/or multi-brightness LED lighting device 20 similar to the multi-voltage and/or multi-brightness LED lighting device 10 described above in FIG. 1. The at least two AC LED circuits 12 are integrated onto a substrate 22. The at least two AC LED circuits 12 configured in a imbalanced bridge circuit, each of which have at least two LEDs 14. The at least two AC LED circuits have electrical contacts 16*a*, 16*b*, 16*c*, and 16*d* on the exterior of the substrate 22 and can be used to electrically configure and/or control the operating voltage and/or brightness level of the multi-voltage and/or multi-brightness LED lighting device.

Figure 3:
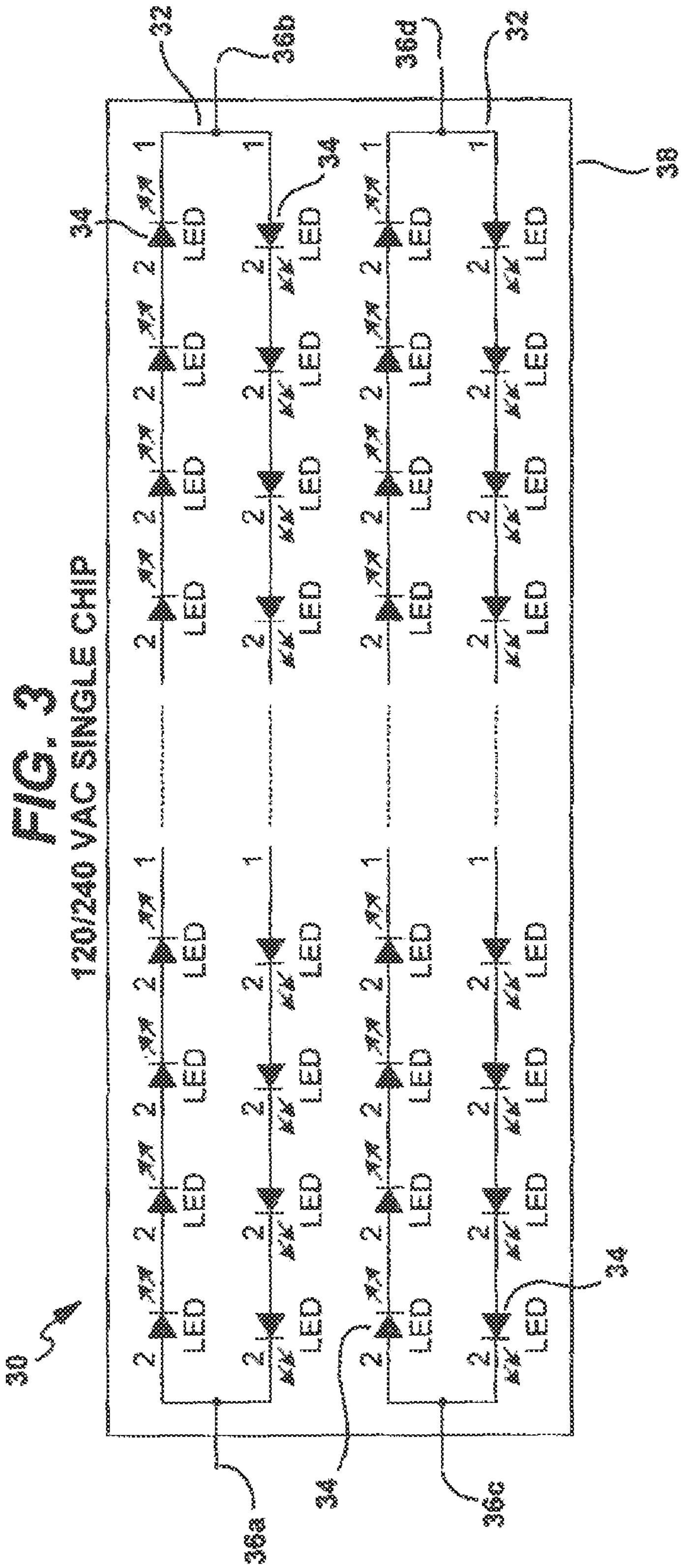
FIG. 3 shows a schematic view of a preferred embodiment of the invention.

FIG. 3 discloses a schematic diagram of a multi-voltage and/or multi-brightness LED lighting device 30 similar to the multi-voltage and/or multi-brightness LED lighting device 10 and 20 described in FIGS. 1 and 2. The multi-voltage and/or multi-brightness LED lighting device 30 comprises at least two AC LED circuits 32 having at least two LEDs 34 connected in series and anti-parallel configuration. The at least two AC LED circuits 32 have electrical contacts 36*a*, 36*b*, 36*c*, and 36*d* at opposing ends to provide various connectivity options for an AC voltage source input. For example, if 36*a* and 36*c* are electrically connected together and 36*b* and 36*d* are electrically connected together and one side of the AC voltage input is applied to 36*a* and 36*c* and the other side of the AC voltage input is applied to 36*b* and 36*d*, the circuit becomes a parallel circuit with a first operating forward voltage. If only 36*a* and 36*c* are electrically connected and the AC voltage inputs are applied to electrical contacts 36*b* and 36*d*, a second operating forward voltage is required to drive the multi-voltage and/or multi-brightness lighting device 30. The multi-voltage and/or multi-brightness lighting device 30 may be a monolithically integrated single chip 38, a monolithically integrated single chip integrated within a LED package 38 or a number of individual discrete die integrated onto a substrate 38 to form a multi-voltage and/or multi-brightness lighting device 30.

Figure 4:
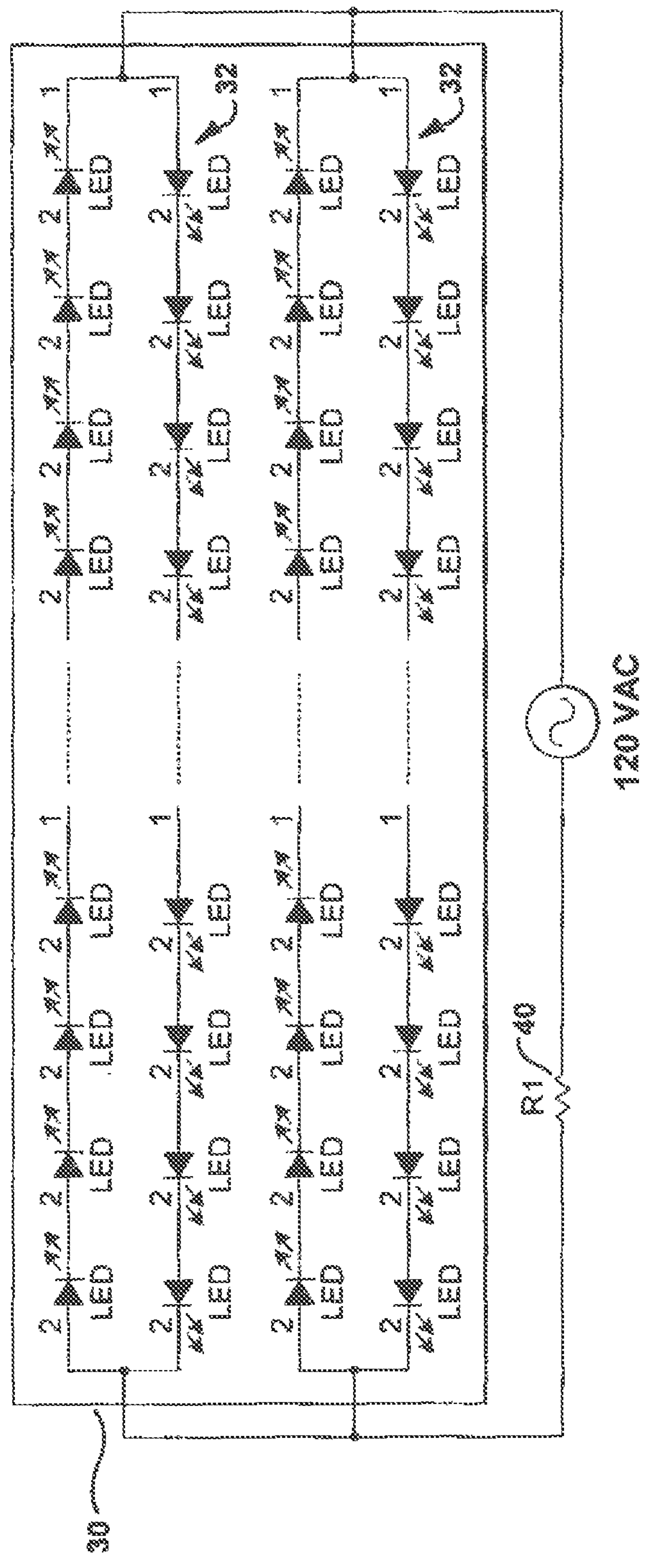
FIG. 4 shows a schematic view of a preferred embodiment of the invention.

FIG. 4 discloses a schematic diagram of the same multi-voltage and/or multi-brightness LED device 30 as described in FIG. 3 having the at least two AC LED circuits 32 connected in parallel configuration to an AC voltage source and operating at a first forward voltage. A resistor 40 may be used to limit current to the multi-voltage and/or multi-brightness LED lighting device 30.

Figure 5:
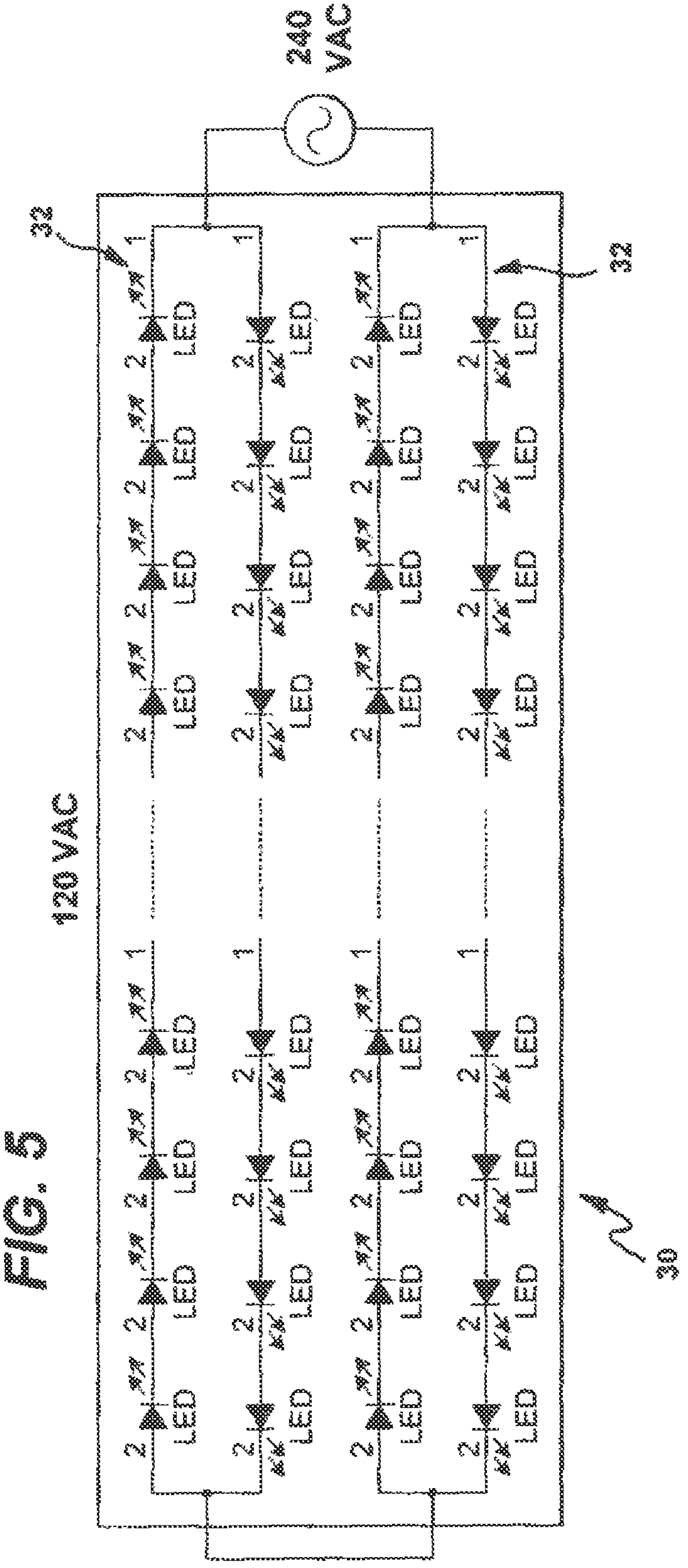
FIG. 5 shows a schematic view of a preferred embodiment of the invention.

FIG. 5 discloses a schematic diagram of the same multi-voltage and/or multi-brightness LED device 30 as described in FIG. 3 having the at least two AC LED circuits 32 connected in series configuration to an AC voltage source and operating at a second forward voltage that is approximately two times greater than the first forward voltage of the parallel circuit as described in FIG. 4. A resistor may be used to limit current to the multi-voltage and/or multi-brightness LED lighting device.

Figure 6B:
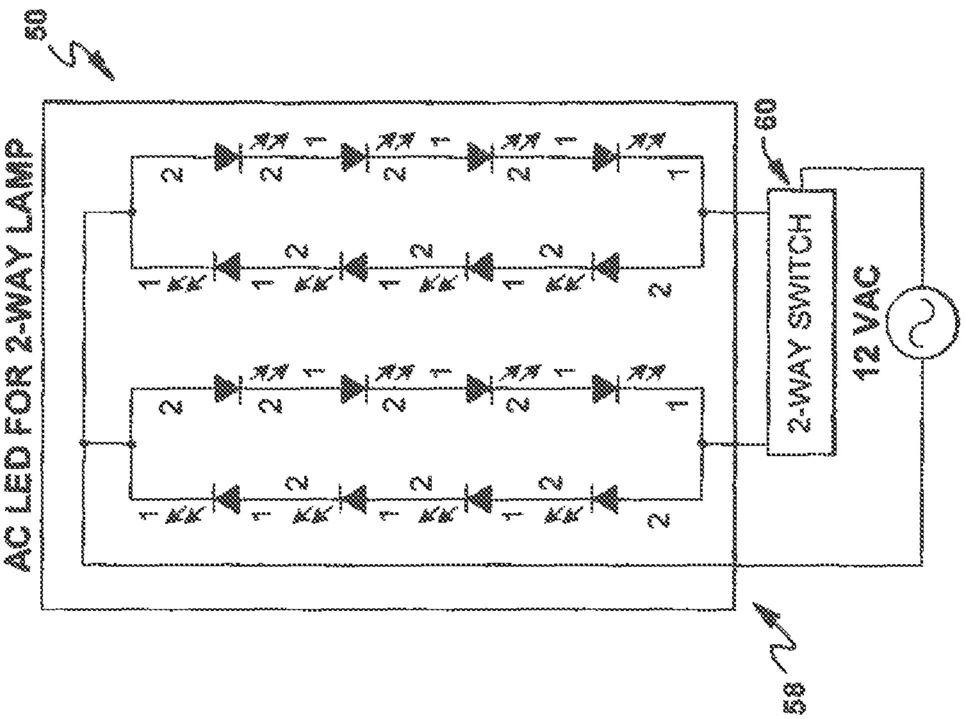
FIG. 6*b* shows a schematic view of a preferred embodiment of the invention.
Figure 6A:
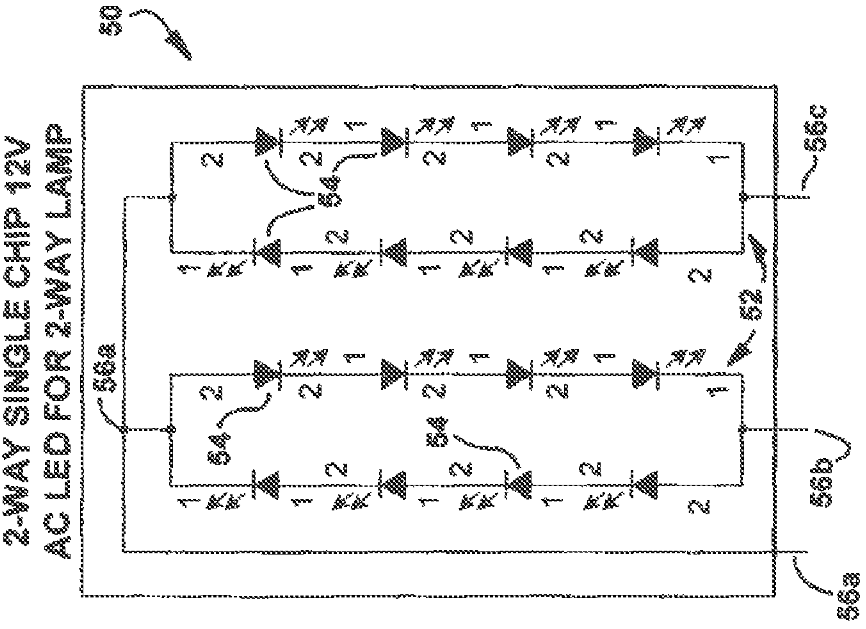
FIG. 6*a* shows a schematic view of a preferred embodiment of the invention.
Figure 7A:
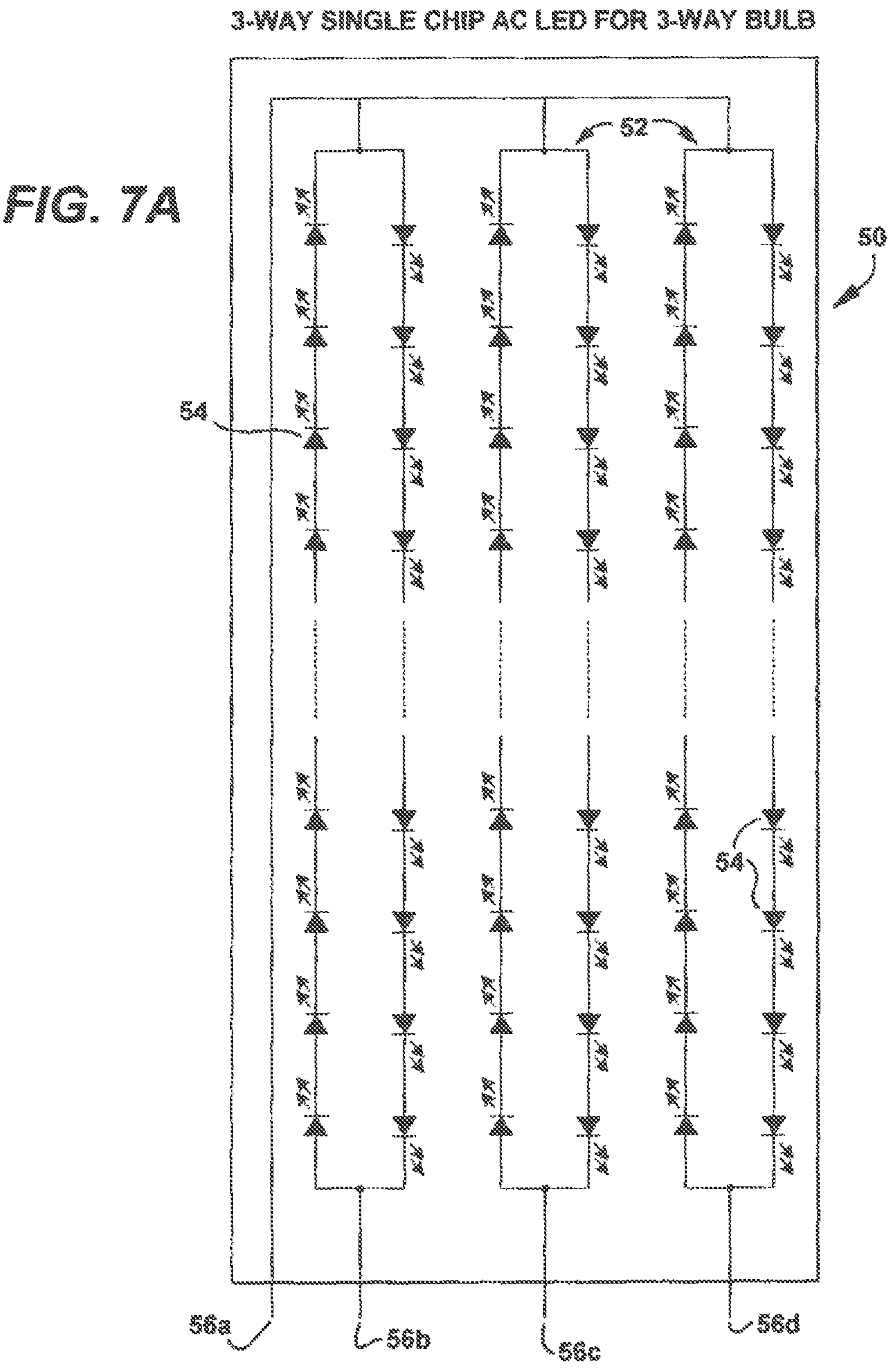
FIG. 7*a* shows a schematic view of a preferred embodiment of the invention.

FIGS. 6*a* and 7*a* disclose schematic diagrams of a multi-voltage and/or multi-brightness LED lighting devices 50. The multi-voltage and/or multi-brightness LED lighting devices 50 comprises at least two AC LED circuits 52, each of which have at least two LEDs 54 in series and anti-parallel relation. The at least two AC LED circuits 52 have at least three electrical contacts 56*a*, 56*b* and 56*c*, and in the case of FIG. 7*a* a fourth electrical contact 56*d*. The at least two AC LED circuits 52 are electrically connected together in parallel at one end 56*a* and left unconnected at the opposing ends of the electrical contacts 56*b* and 56*c*, and in the case of FIG. 7*a*, 56*d*. One side of an AC voltage source line is electrically connected to 56*a* and the other side of an AC voltage source line is individually electrically connected to 56*b*, 56*c*, and 56*d* with either a fixed connection or a switched connection thereby providing a first brightness when AC voltage is applied to 56*a* and 56*b* and a second brightness when an AC voltage is applied to 56*a*, 56*b* and 56*c*, and a third brightness when an AC voltage is applied to 56*a*, 56*b*, 56*c*, and 56*d*. It is contemplated that the multi-voltage and/or multi-brightness LED lighting devices 50 are a single chip, an LED package, an LED assembly or an LED lamp.

Figure 7B:
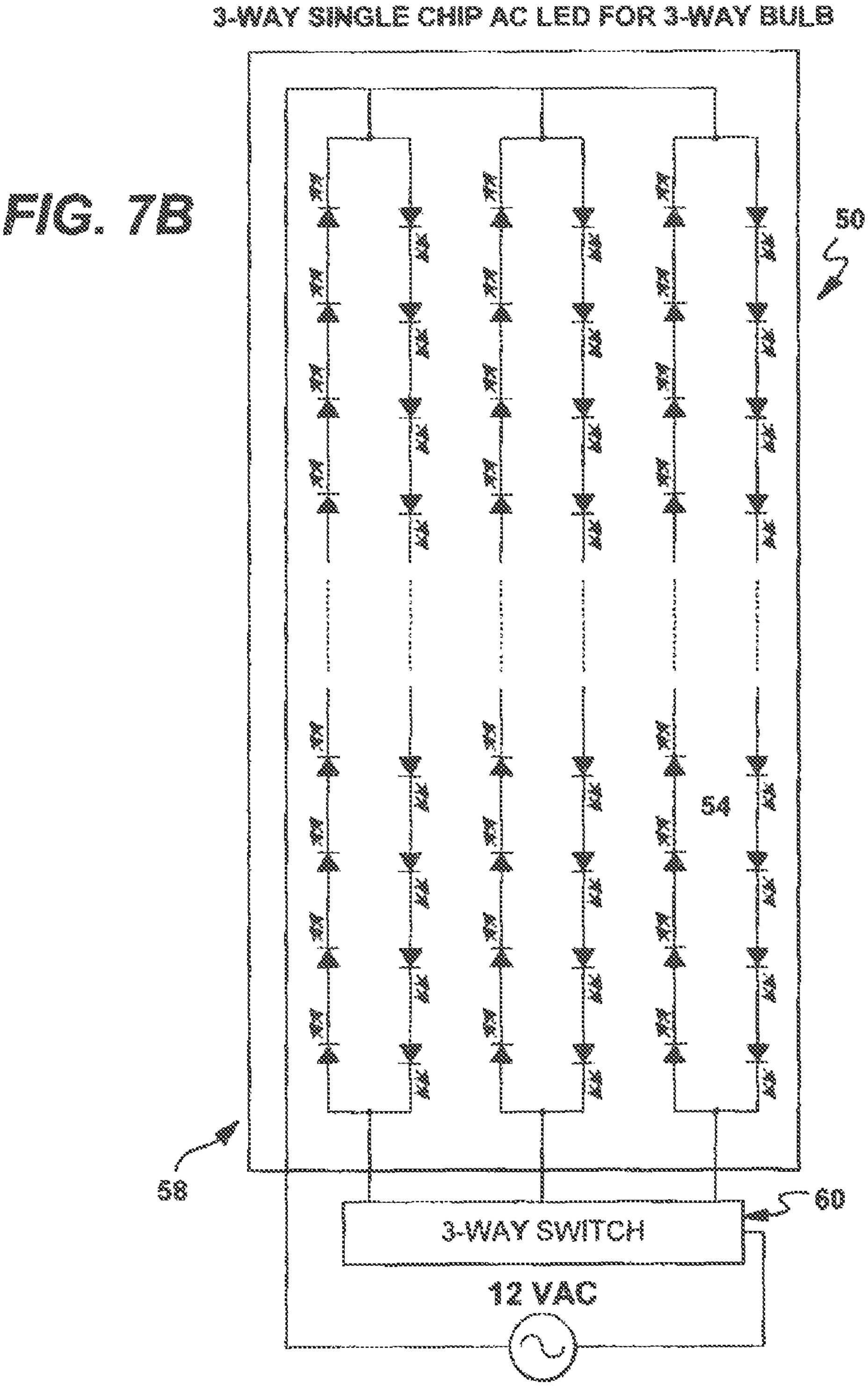
FIG. 7*b* shows a schematic view of a preferred embodiment of the invention.

FIGS. 6*b* and 7*b* disclose a schematic diagram similar to the multi-voltage and/or multi-brightness LED device 50 shown in FIGS. 6*a* and 7*a* integrated within a lamp 58 and connected to a switch 60 to control the brightness level of the multi-voltage and/or multi-brightness LED lighting device 50.

Figure 8:
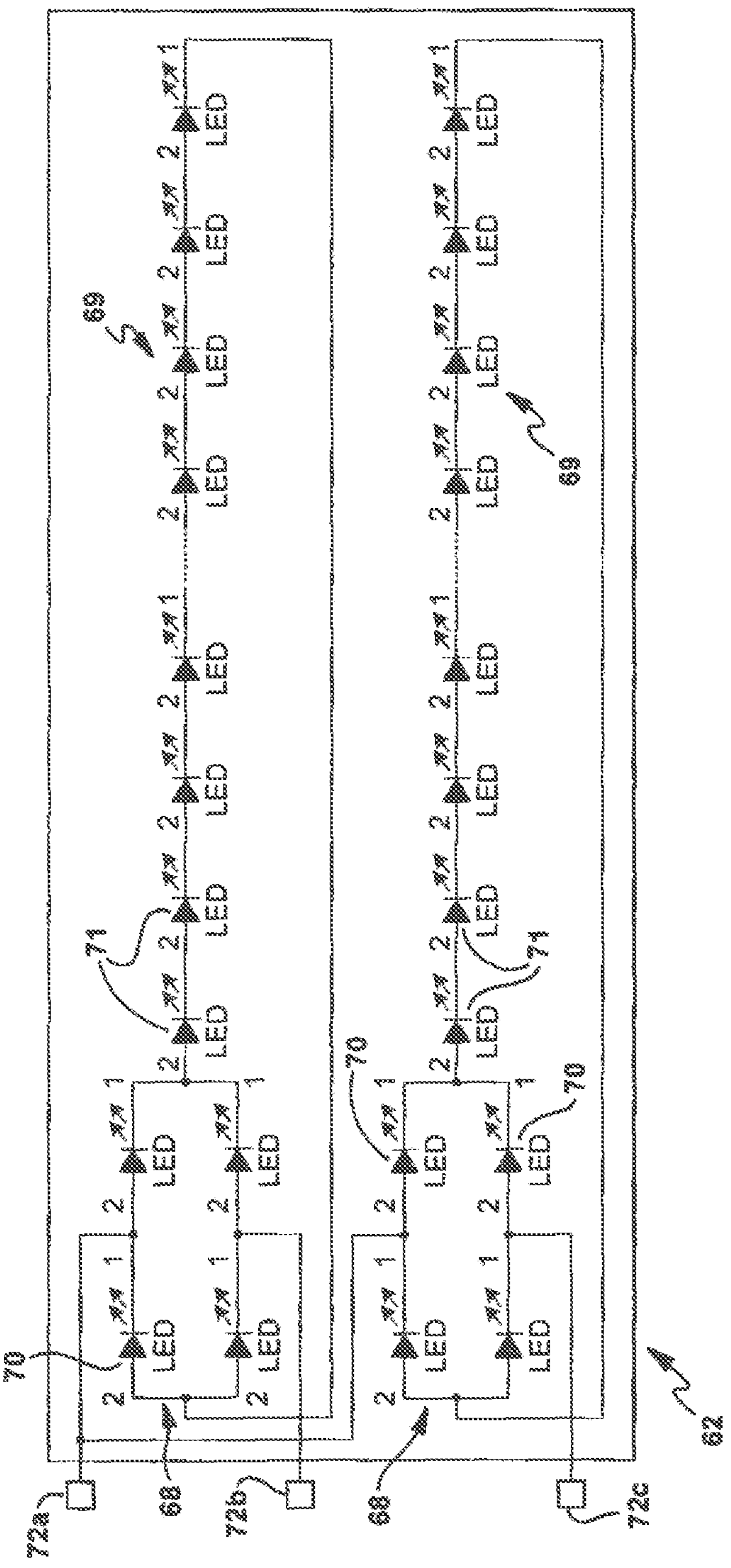
FIG. 8 shows a schematic view of a preferred embodiment of the invention.

FIG. 8 discloses a schematic diagram of a multi-brightness LED lighting device 62 having at least two bridge rectifiers 68 in series with LED circuits 69. Each of the at least two bridge rectifiers 68 in series with LED circuits 69 comprise four LEDs 70 configured in a bridge circuit 68. LED circuits 69 have at least two LEDs 71 connected in series and electrical contacts 72*a*, 72*b* and 72*c*. When one side of an AC voltage is applied to 72*a* and the other side of an AC voltage line is applied to 72*b* and 72*c* individually, the brightness level of the multi-brightness LED lighting device 62 can be increased and/or decreased in a fixed manner or a switching process.

Figure 9:
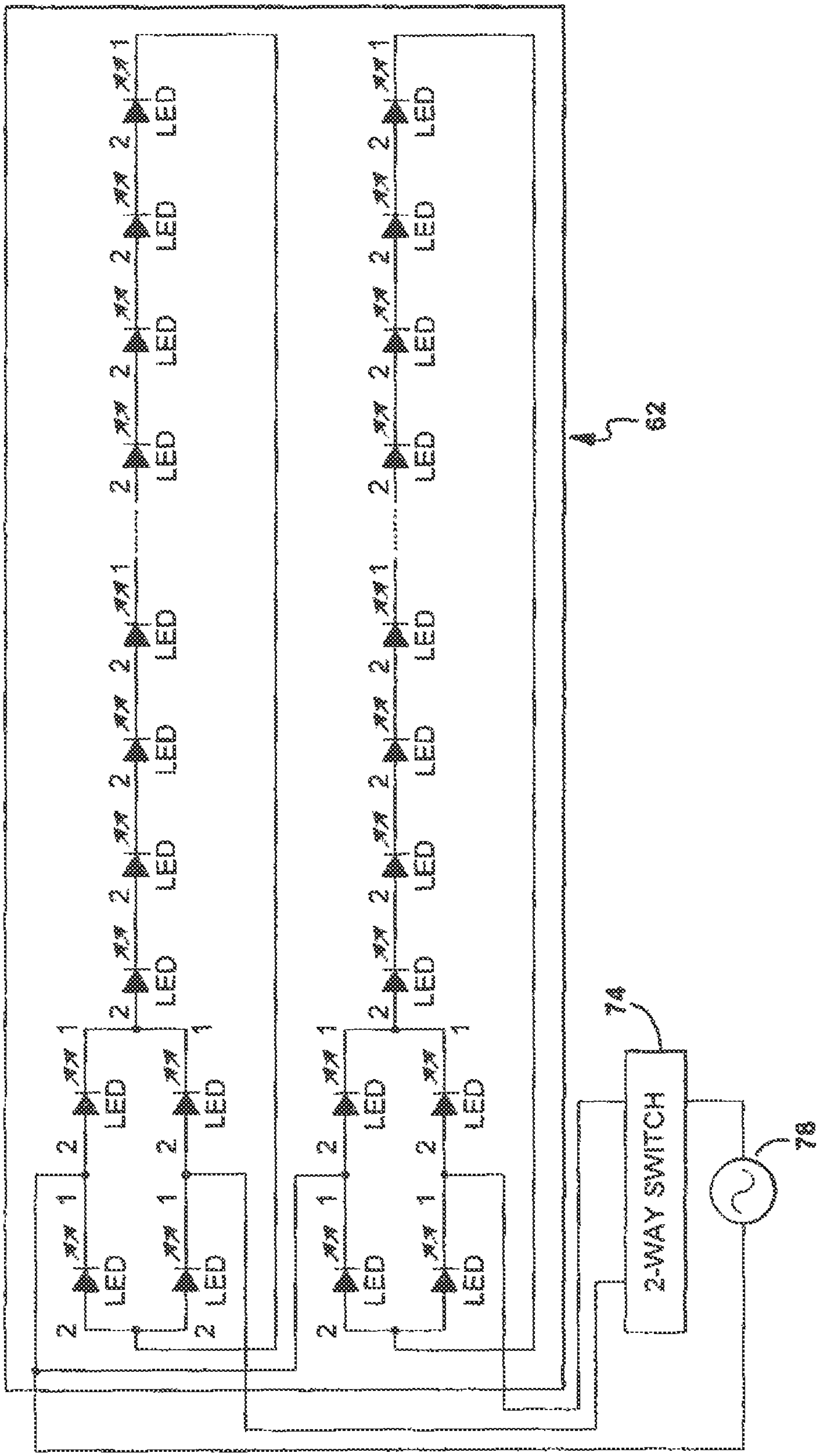
FIG. 9 shows a schematic view of a preferred embodiment of the invention.

FIG. 9 discloses a schematic diagram the multi-brightness LED lighting device 62 as shown above in FIG. 8 with a switch 74 electrically connected between the multi-brightness LED lighting device 62 and the AC voltage source 78.

FIG. 9 discloses a schematic diagram of at least two single voltage LED circuits integrated with a single chip or within a substrate and forming a multi-voltage and/or multi-brightness LED device.

Figure 10:
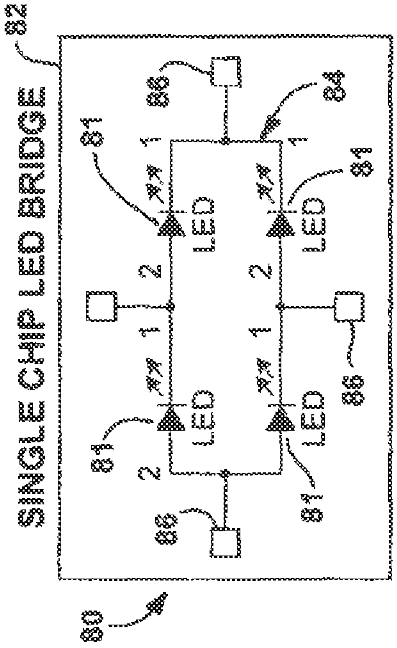
FIG. 10 shows a schematic view of a preferred embodiment of the invention.

FIG. 10 discloses a schematic diagram of a single chip LED bridge circuit 80 having four LEDs 81 configured into a bridge circuit and monolithically integrated on a substrate 82. The full wave LED bridge circuit has electrical contacts 86 to provide for AC voltage input connectivity and DC voltage output connectivity.

Figure 11:
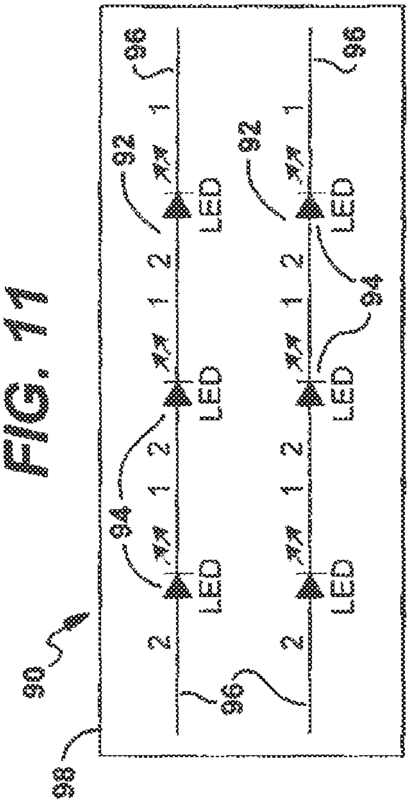
FIG. 11 shows a schematic view of a preferred embodiment of the invention.

FIG. 11 discloses a schematic diagram of another embodiment of a single chip multi-voltage and/or multi-brightness LED lighting device 90. The multi-voltage and/or multi-brightness LED lighting device 90 has at least two series LED circuits 92 each of which have at least two LEDs 94 connected in series. The at least two series LED circuits 92 have electrical contacts 96 at opposing ends to provide a means of electrical connectivity. The at least two series LED circuits are monolithically integrated into a single chip 98. The electrical contacts 96 are used to wire the at least two series LEDs circuit 92 into a series circuit, a parallel circuit or an AC LED circuit all within a single chip.

Figure 12:
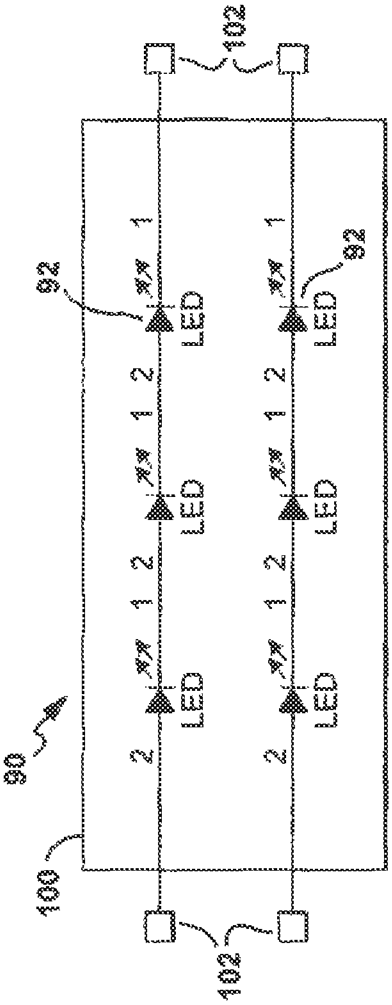
FIG. 12 shows a schematic view of a preferred embodiment of the invention.

FIG. 12 discloses a schematic diagram of the same multi-voltage and/or multi-brightness LED lighting device 90 as shown above in FIG. 11. The multi-voltage and/or multi-brightness LED lighting device 90 has at least two series LED circuits 92 each of which have at least two LEDs 94 connected in series. The at least two series LED circuits can be monolithically integrated within a single chip or discrete individual die can be integrated within a substrate to form an LED package 100. The LED package 100 has electrical contacts 102 that are used to wire the at least two series LEDs circuit into a series circuit, a parallel circuit or in anti-parallel to form an AC LED circuit all within a single LED package.

Figure 13:
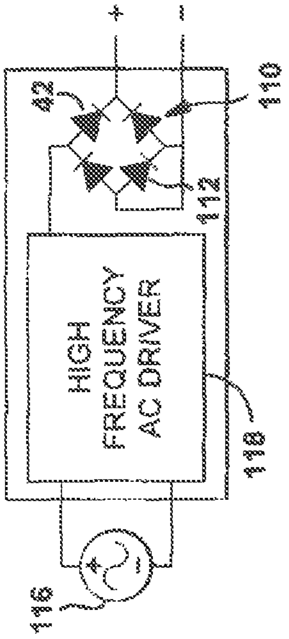
FIG. 13 shows a schematic view of a preferred embodiment of the invention.
Figure 14:
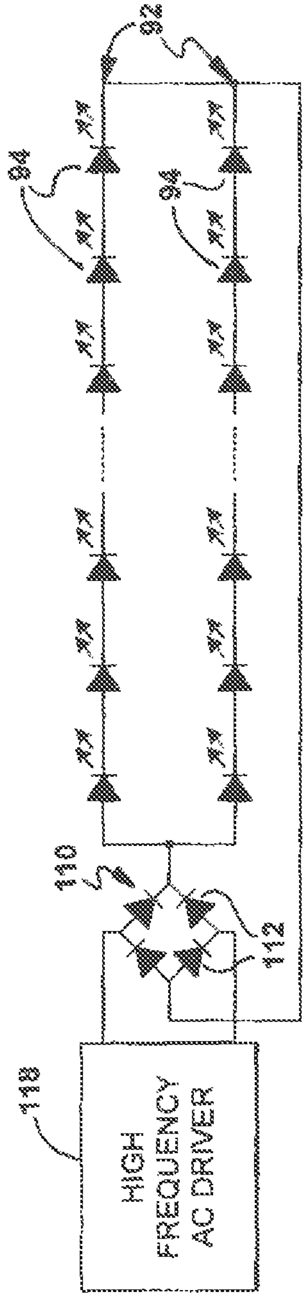
FIG. 14 shows a schematic view of a preferred embodiment of the invention.
Figure 15:
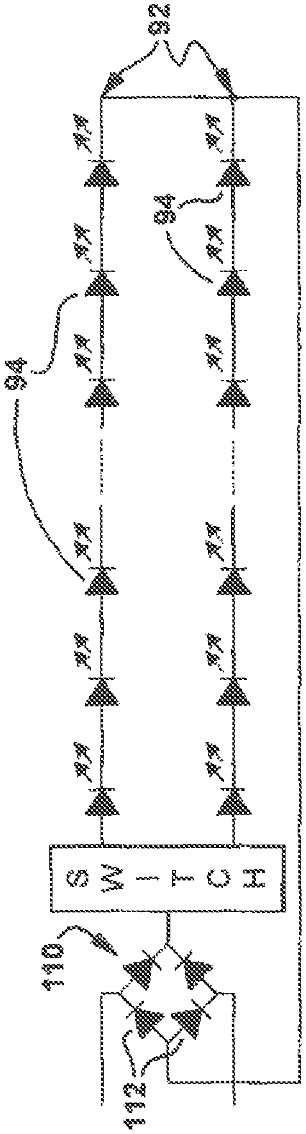
FIG. 15 shows a schematic view of a preferred embodiment of the invention.

As seen in FIGS. 13-15, a single rectifier 110 may be provided for two or more LED circuits 92, each containing at least two LEDs 94 connected in series. The single rectifier 110 comprises standard diodes 112 connected to an AC voltage source 116, or in the alternative may be connected to a driver or power supply which ultimately provides an AC voltage, like for example a high frequency AC driver 118. The single rectifier 110 is electrically connected to the LED circuits 92. Specifically, the rectifier 110 connects to a common junction of an anode of at least one LED 94 in each LED circuit 92, and to the cathode of at least one LED 94 in each LED circuit 92. As shown in FIG. 15, the rectifier may instead be connected to a switch, allowing for either one or both of LED circuits 92 to be operative at any given time.

It is contemplated by the invention that diodes 112 in FIGS. 13-15 are interchangeable with LEDs 70 in rectifiers 68 in FIGS. 8 and 9 and vice versa. As should be appreciated by those having skill in the art, any combination of LEDs 70 and diodes 112 can be used in rectifiers 68 and 110, so long as rectifiers 68 and 110 provide DC power from an AC source.

As shown in FIGS. 13 and 14, and further shown in FIGS. 16-20, any lighting devices, chips, or AC LED or DC LED circuits contemplated by the present invention may be powered through a high-frequency AC driver 118. As shown in FIG. 13, any AC source 116 may be connected to the high-frequency driver or inverter or transformer 118, however, as shown in FIGS. 16-20 it is contemplated that low frequency voltage 124, like for example a mains voltage, is provided to the high-frequency driver or transformer or inverter 118.

Figure 16:
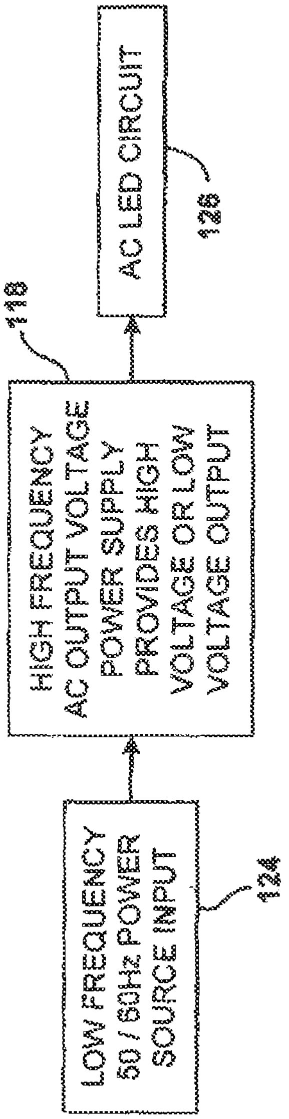
FIG. 16 shows a block diagram of a preferred embodiment of the invention.
Figure 17:
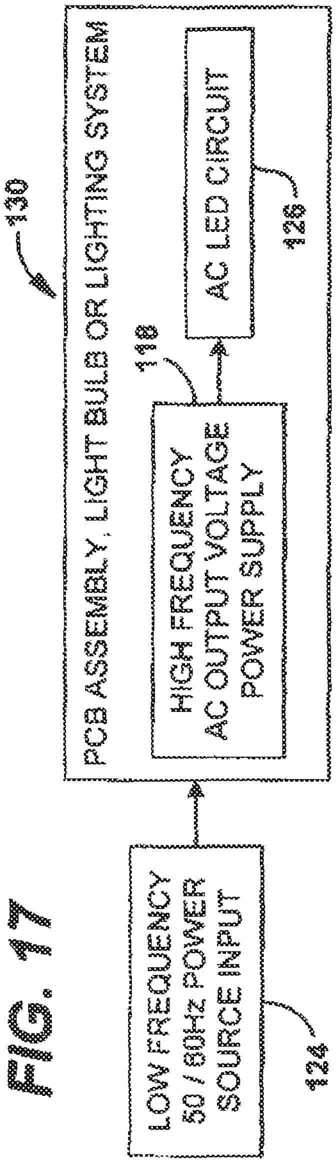
FIG. 17 shows a block diagram of a preferred embodiment of the invention.

FIGS. 16 and 17 show two embodiments of an AC LED lighting system 140 wherein a high-frequency AC driver, inverter, or transformer 118 for provides a high-frequency voltage to an AC LED circuit, lighting device, or chip 126. AC LED circuit, lighting device, or chip 126 may be any of the devices, circuits, or chips shown and described in FIGS. 1-7, like for example LED lighting devices 10, 20, 30 and/or AC LED circuits 12, 32, or any combination thereof. When multiple AC LED circuits, lighting devices, or chips are connected to the high-frequency driver in combination, such AC LED circuit(s), lighting device(s), or chip(s) may be connected together in either a series relationship, a parallel relationship, or a series-parallel relationship.

As shown in FIG. 16, the high-frequency AC driver, inverter or transformer 118 may be packaged separately from an (or multiple) AC LED circuit, device, or chip 126. In such embodiments a power source 128 provides voltage to the high-frequency AC driver, inverter or transformer 118 which steps up the frequency of the voltage to a higher frequency and provides the higher-frequency voltage to the AC LED circuit(s), device(s), or chip(s) 126. High-frequency AC driver, inverter, or transformer 118 may further include necessary circuitry, for example a transformer, for stepping-up or stepping-down the AC voltage provided by the power source 128.

As shown in FIG. 17, high-frequency AC driver 118 may be packaged with AC LED circuit(s), device(s), or chip(s) 126 in a unitary AC LED light bulb, lighting element 130. It is contemplated by the invention that a switch may be configured between the high-frequency driver 118 and the AC LED circuit(s), device(s), or chip(s) 126 for selectively operating one or more AC LED circuit, lighting device, or chip. For example, as shown in FIGS. 6A, 6B, 7A, and 7B a 2-way or 3-way switch may be attached at the input side of the AC LED circuit(s), lighting device(s), or chip(s). Such a switch may be located between the high-frequency AC driver, inverter, or transformer 118, and the AC LED circuit(s), lighting device(s), or chip(s).

FIGS. 14 and 18-20 show a DC LED lighting system 142 having a DC LED circuit(s), device(s), or chip(s) 92, 132 being powered by a high-frequency AC driver, inverter, or transformer 118 through a rectifier 110. In operation, the combination of AC sources 116, 128, high-frequency AC driver, inverter or transformer 118, and DC LED circuit, device, or chip 92, 132 operate in substantially the same manner as that described with respect to FIGS. 16 and 17. However, in each system shown in FIGS. 14 and 18-20, rectifier 110 rectifies the high-frequency AC voltage output of the high-frequency AC driver before a voltage is provided to the DC LED circuit(s), device(s), or chip(s) 92, 132. DC LED circuit(s), device(s), or chip(s) 132 are not limited in form to just circuit 92, and instead may take the form of any of the lighting devices, circuits, or chips shown and described, for example, in FIGS. 8-12. When multiple DC LED circuits, lighting devices, or chips are connected to the high-frequency driver in combination, such DC LED circuit(s), lighting device(s), or chip(s) may be connected together in either a series relationship, a parallel relationship, or a series-parallel relationship. Additionally, as shown in FIG. 15, a switch, like for example a 2-way switch or a 3-way switch, may also be attached at the input side of DC LED circuit(s), device(s), or chip(s).

Figure 18:
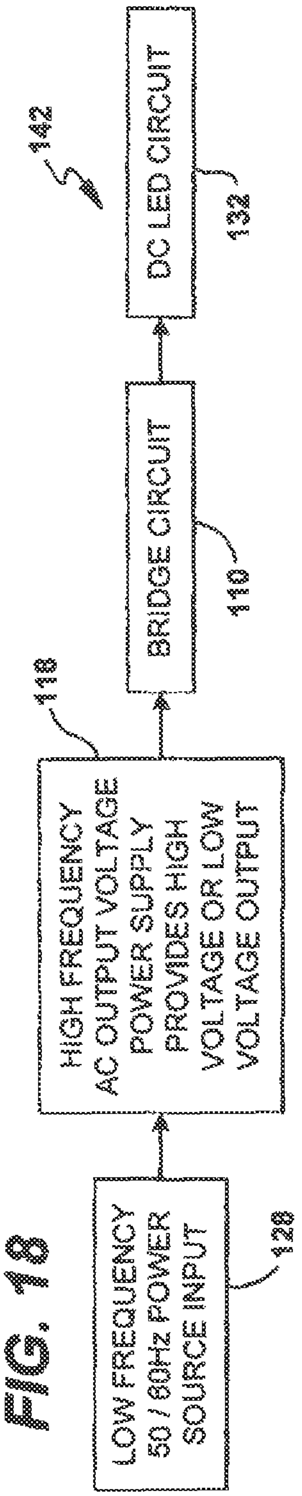
FIG. 18 shows a block diagram of a preferred embodiment of the invention.
Figure 19:
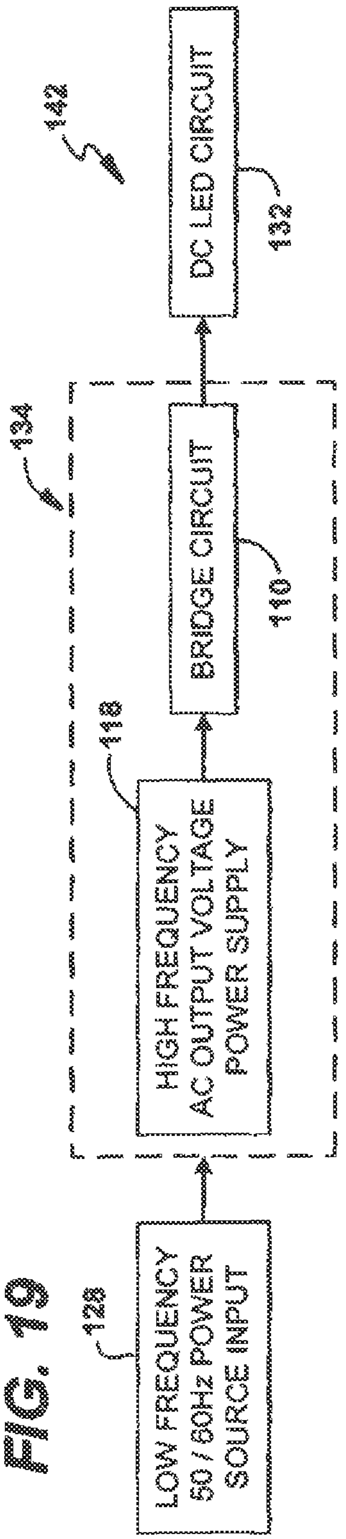
FIG. 19 shows a block diagram of a preferred embodiment of the invention; and, FIG. 20 shows a block diagram of a preferred embodiment of the invention.
Figure 20:
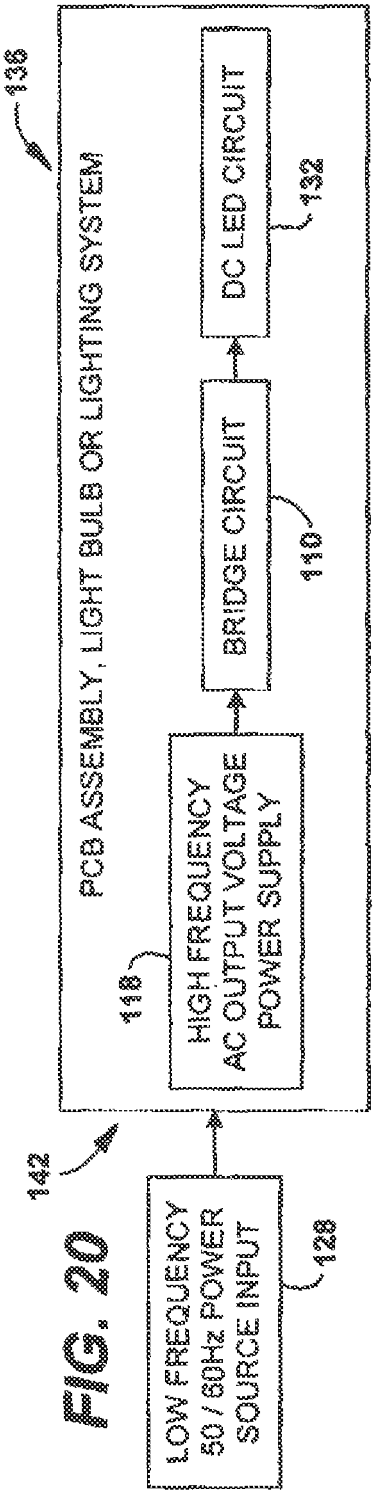

As shown in FIGS. 18-20, like in an AC embodiment, AC driver 118, rectifier 110, and DC LED circuit(s), device(s), or chip(s) 132 may be packaged in any number of ways. As shown in FIG. 18, each element may be packaged separately and electrically connected together in series. Alternatively, as shown in FIG. 19, a DC LED driver 134 may be formed by combining the high-frequency AC driver 118 with rectifier 110. As shown in FIG. 20, an additional alternative contemplated by the invention is forming a DC LED lighting element 136, Which may be embodied as a light bulb, lighting system, lamp, etc., wherein the DC LED lighting element 136 includes each of a high-frequency AC driver 118, a rectifier 110, and a DC LED circuit(s), lighting device(s), or chip(s) 132. It should be appreciated by those having skill in the art that a lighting element containing only rectifier 110 and a DC LED circuit(s), lighting device(s), or chip(s) 132 may also be designed. Such lighting elements have the advantage of being able to be plugged into any AC source, whether it is a high-frequency AC driver, inverter, or transformer, or a simple mains voltage, and provide a light output in the same manner as the imbalanced circuit shown in, for example FIGS. 1-7.

Figure 21:
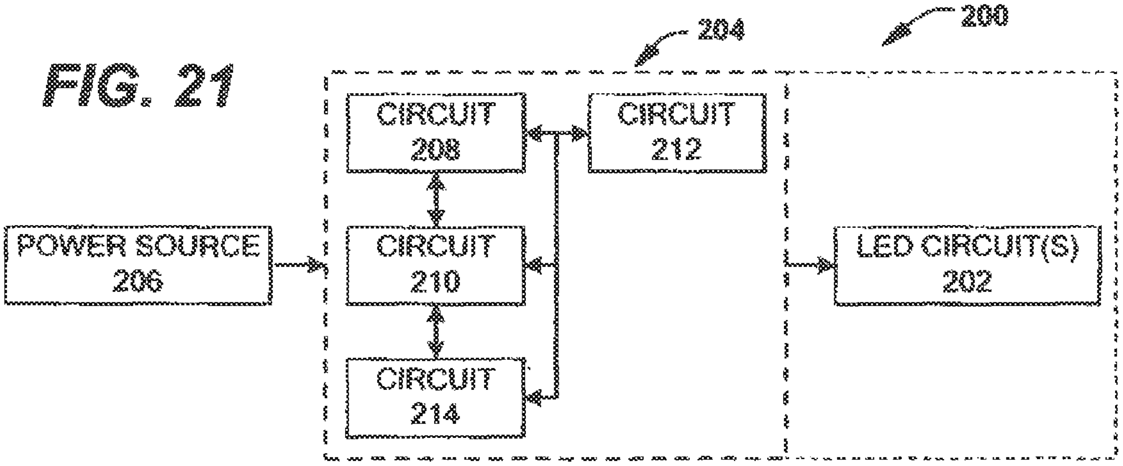
FIG. 21 shows a block diagram of an embodiment of an LED system as contemplated by the invention.
Figure 22:
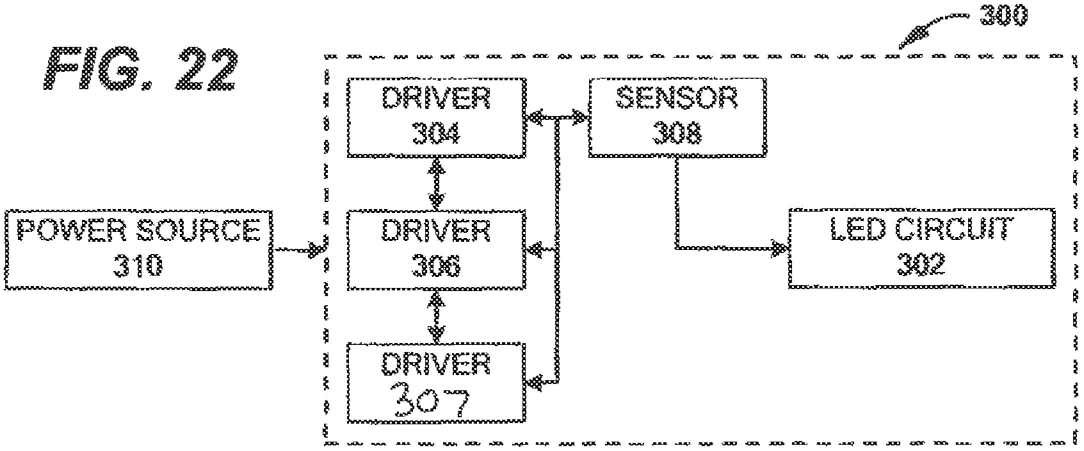
FIG. 22 shows a block diagram of an embodiment of an LED system as contemplated by the invention.

FIGS. 21 and 22 show embodiments of a lighting system which may be used to incorporate any of the AC LED or DC LED drivers, lighting devices, circuits, chips or the like discussed herein.

FIG. 21 shows lighting system 200 having at least one LED circuit 202 connected as a load to driver 204. LED circuit 202 has at least two LEDs connected in series and may be configured in any manner shown and discussed in any of figures, like for example, FIGS. 1-9, 11, and 12, or as shown and discussed later in FIG. 24. As should be appreciated by those having ordinary skill in the art, it is contemplated that lighting system 200 may include two or more LED circuits 202 connected in series, parallel, or series parallel wherein each LED circuit 202 has at least two LEDs connected in series.

Driver 204 in lighting system 200 has an input, like for example a plug, power cord, or other adapter capable of connecting to a power source, for receiving a first AC voltage and frequency from power source 206, which may be any AC power source including a mains power source, and includes at least first circuit 208 and second circuit 210 which are each capable of receiving the first AC voltage and first frequency. Circuits 208, 210 each have an output capable of being connected the at least one LED circuit 202 for driving the at least two LEDs connected therein. As seen in FIG. 21, driver 204 may additionally include circuit 214 which is substantially similar to circuits 208, 210. As should be appreciated by those having ordinary skill in the art, any number of circuits may be included in driver 204 so long as each additional circuit is capable of receiving the first AC voltage and first frequency, and having an output capable of being connected the at least one LED circuit 202 for driving the at least two LEDs connected therein.

Driver 204 further includes a sensor in the form of circuit 212 which is configured to sense and permit the output of only one of first circuit 208 or second circuit 210 to be provided to the at least one LED circuit 202. For example, circuit 212 may be configured to sense the output from both first circuit 208 and second circuit 210 and allow only the output of first circuit 208 to be provided to at least one LED circuit 202 while the output of circuit 210 is blocked or not provided to at least one LED circuit 202. If circuit 212 no longer senses an output from circuit 208, because for example circuit 208 has failed, circuit 212 may disconnect or block the output of circuit 208 from at least one LED circuit 202, and connect the output of circuit 210 to at least one LED circuit 202 so that circuit 210 drives at least one LED circuit 202. As should be appreciated by those having ordinary skill in the art, in embodiments including circuit 214 or any additional circuits capable of receiving the first AC voltage and first frequency and having an output capable driving at least one LED circuit 202, circuit 212 may be configured to allow only a single output through and connect a new circuit output each time the circuit providing an output to at least one LED circuit 202 fails.

In order to achieve this function, circuit 212 may include any sensor and/or switch combination known to those of ordinary skill in the art capable of detecting or sensing the output of circuits 208 and 210, and blocking the outputs so only a single output is provided to at least one LED circuit 202 at all times so long as one of circuit 208 and 210 are operational. Examples of circuits which may be used as circuit 212 include a relay circuit, a micro-controller IC, or a voltage level sensing circuit connected between the output of circuits 208 and 210 and at least one LED circuit 202.

In alternative embodiments, circuit 212 may include a logic gate and multiple circuits, each of the multiple circuits including an RMS converter and a window voltage comparator controlling an analog switch. Each RMS converter would receive the output of circuit 208 or circuit 210 and convert the output voltages to an RMS voltage. The RMS voltage may then be provided to a respective window voltage comparator, and be compared to high and low reference voltages stored in the each window voltage comparator. If the measured RMS voltage is within the high or low reference range, the comparator may then close an analog switch, allowing the output of circuit 208 or 210 to proceed to the logic gate. The logic gate may then be configured to allow only one received output from circuit 208 or 210 to pass through and be provided to at least one LED circuit 202. If the allowed output from either of circuit 208 or 210 fails and is not provided, the logic gate may then allow the non-allowed output from 208 or 210 to be provided to at least one LED circuit 202. Utilizing a logic gate receiving multiple inputs and an RMS converter and window voltage comparator has the added benefit of blocking the output from either of circuit 208 or 210 if the output is too high or too low, insuring maximum efficiency when driving at least one LED circuit 202.

Regardless of what is used for circuit 212, it should be appreciated by those having ordinary skill in the art that a two-way or three-way switch like that shown and described in FIGS. 6A and 6B or 7A and 7B may be provided on the back end of circuit 212 wherein the two-way or three-way switch may connect additional LED circuits formed as part of at least one LED circuit 202. Utilizing a switch may allow for additional LED circuits to be turned on and off, adjusting the brightness of system 200.

As should be appreciated by those having ordinary skill in the art, any two-way or three-way switch may also be utilized to join the output of circuits 208 and 210, as well as any additional similar circuits included in driver 204, to provide additional power to at least one LED circuit 202. For example, the switch may be used to combine the outputs of circuits 208 and 210 into a single output before reaching circuit 212, or alternatively may alter the logic of a logic gate used in circuit 212, allowing the output of both circuits 208 and 210 to be provided to at least one LED circuit 202.

FIG. 22 shows an alternative embodiment to FIG. 21 wherein lighting system 300 contains at least one LED circuit 302, which is substantially similar to LED circuit 202, drivers 304 and 306 and sensor 308. In operation, drivers 304 and 306 function in a similar manner as circuits 208 and 210 and sensor 308 may function in substantially the same manner as circuit 212. In the embodiment shown in FIG. 22, however, drivers 304 and 306 may be packaged separately from sensor 308. Packaging each driver 304 and 306 separately may also allow for either driver to be easily replaced within system 300 if either driver 304 or 306 fails.

Drivers 304 and 306 each have a first input for receiving a first AC voltage and frequency and each contain an output capable of being connected to the at least one LED circuit 302 through sensor 308. In embodiments where multiple drivers are used, lighting system 300 may include a single input for power from power source 310, like for example a plug, power cord, or other adapter capable of connecting to and transmitting an AC voltage.

As with the embodiment described in FIG. 21, in embodiments where multiple drivers are used, sensor 308 may be configured to receive the output of the drivers 304 and 306, sense the voltages, and allow only a single output to be provided to at least one LED circuit 302. Sensor 308 may include a relay circuit, a micro-controller IC, or a voltage level sensing circuit connected between the output of circuits 208 and 210 and at least one LED circuit 202.

In alternative embodiments, sensor 308 may include a logic gate and multiple circuits, each of the multiple circuits including an RMS converter and a window voltage comparator controlling an analog switch. Each RMS converter would receive the output of driver 304 or driver 306 and convert the output voltages to an RMS voltage. The RMS voltage may then be provided to a respective window voltage comparator, and be compared to high and low reference voltages stored in the each window voltage comparator. If the measured RMS voltage is within the high or low range, the comparator may then close an analog switch, allowing the output of driver 304 or 306 to proceed to the logic gate. The logic gate may then be configured to allow only one received output from drivers 304 or 306 to pass through and be provided to at least one LED circuit 302. If the allowed output from either of driver 304 or 306 fails and is not provided, the logic gate may then allow the non-allowed output from drivers 304 or 306 to be provided to at least one LED circuit 302. Utilizing a logic gate receiving multiple inputs and an RMS converter and window voltage comparator has the added benefit of blocking the output from either of drivers 304 and 306 if the output is too high or too low, insuring maximum efficiency when driving at least one LED circuit 302.

Figure 23:
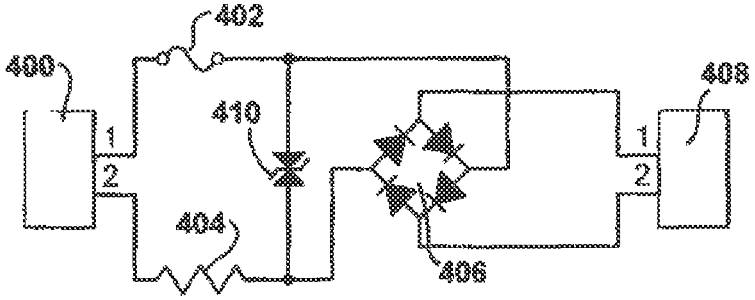
FIG. 23 shows a schematic diagram of a circuit or driver as contemplated by the invention.

While circuits 208, 210 and drivers 304, 306 may be any of the drivers or circuits discussed herein capable of driving LED circuits, FIG. 23 shows one embodiment of circuits 208, 210 and a configuration for drivers 304, 306 as contemplated by the invention. As should be appreciated by those having ordinary skill in the art, each of the circuit shown in FIG. 23 may be packaged separately forming drivers 304, 306, or packaged together in a single driver forming driver 204. As such, it should be understood when referring to FIG. 23, the terms circuits 208, 210 may be used interchangeably with the terms driver 304, 306.

As seen in FIG. 23, circuits 208, 210 each contain AC input 400, connected in series with fuse 402, resistor 404, and bridge rectifier 406 which provides DC output 408 from circuits 208, 210 to a sensor or circuit and at least one LED circuit. Circuits 208, 210 may also include a voltage suppressor 410 connected in series with fuse 402 and resistor 404, while being connected in parallel with rectifier 406. Voltage suppressor 410 may be a transient voltage suppressor used to protect rectifier 406 and any sensor or circuit or LED circuits connected to the output of the circuit 208 or 210. Circuits 208, 210 and drivers 304, 306 may further include a transformer for stepping the provided AC voltage up or down and/or to adjust the provided AC frequency up or down.

Driver 204 may further include further include at least two capacitors connected to a fourth circuit wherein the fourth circuit only allows one of the at least two capacitors to connect to the first or second circuit or any additional circuits included in driver 204 which are providing an output to LED circuit 202. The fourth circuit may be configured to disconnect the one of the at least two capacitors connected to the first or second circuit if the one capacitor fails and then connect at least one other capacitor from the at least two capacitors to circuits 208, 210. The fourth circuit may be configured to connect any one of the at least two capacitors anywhere within the first or second circuit, and preferably in parallel with bridge rectifier 406.

In embodiments like that shown in FIG. 22 wherein multiple drivers are provided for lighting system 300, each driver 304, 306, 307 may contain at least two capacitors and an internal sensor wherein the internal sensor only one of the at least two capacitors to form a portion of the driver, i.e. form a portion of the circuit shown in FIG. 23.

Figure 24:
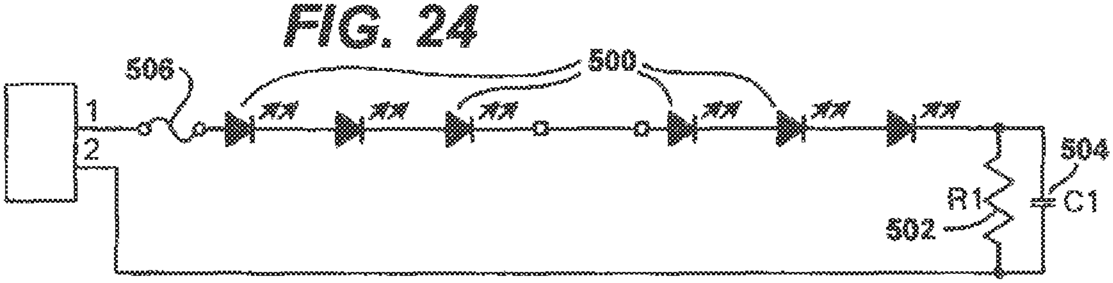
FIG. 24 shows a schematic diagram of an LED circuit as contemplated by the invention.

A resistor may be connected in series with the at least two LEDs forming at least one LED circuit 202, 302 in order to suppress the current provided by driver 204 or drivers 304, 306 to further protect the at least two LEDs. FIG. 24 shows an embodiment of at least one LED circuit 202, 302 for use in conjunction with circuits 208, 210 and drivers 304, 306 shown in FIG. 23, wherein at least two LEDs 500 are connected in series with resistor 502. As seen in FIG. 24, LED circuit 202, 302 may further include a capacitor 504 connected in series with LEDs 502 and in parallel with resistor 502 for smoothing the received output from driver 204 or drivers 304, 306. LED circuit 202, 302 finally may also include a fuse 506 to further protect LED circuit 202, 302 from any surge currents.

In embodiments where mains power is directly rectified and provided to LED circuit 202, 302 through circuit 212 or sensor 308, LEDs 500 may be high voltage LEDs having a forward voltage of at least 36V. However, it should be appreciated that LEDs having any forward voltage may be utilized, so long as the total forward voltage across each LED is satisfied by the provided output from driver 204 or drivers 304, 306.

Figure 25:
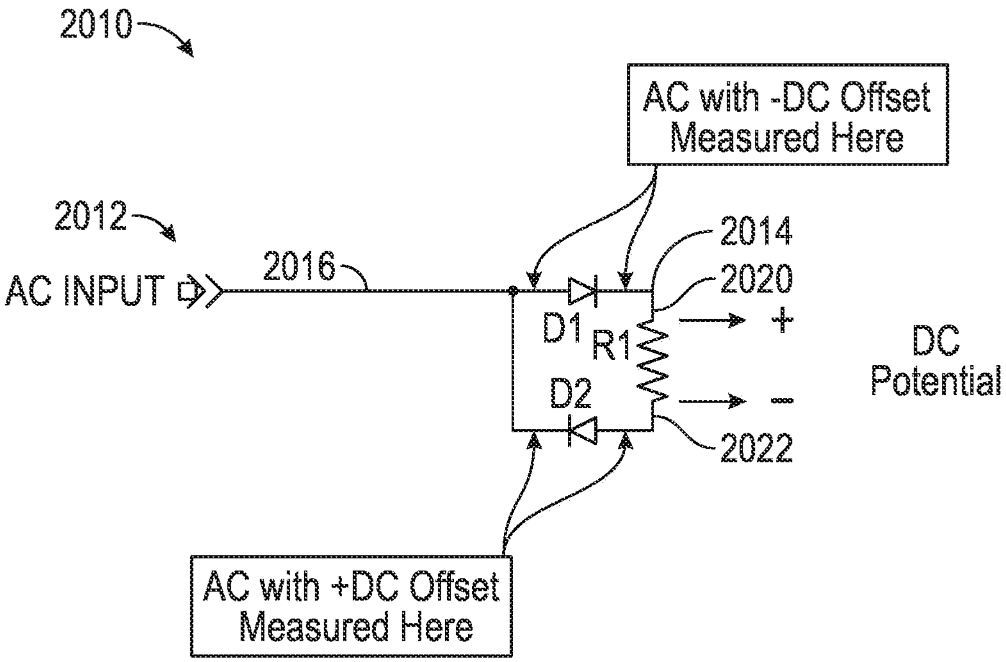
FIG. 25 shows a schematic view of a preferred embodiment of the invention.

FIG. 25 discloses a preferred circuit 2010 according to the invention. The circuit 2010 includes a first source for providing an alternating electric field. The source may be 120V or 240V line power, RF energy or the output of a standard AC signal generator such as generator 2012 of FIG. 25. This generator 2012 may produce its signal with reference to ground as indicated in FIG. 25. Circuit 2010 also discloses a directional circuit 2014 connected to the generator 2012 by a transmission conductor 2016. According to the invention the conductor 2016 may be any form of conventional conductive path whether twisted wire bundles, single wires, etc. The point is that the transmission conductor 2016 provides a single transmission path to the directional circuit 2014. Important to the invention is the fact that there is no conductive return path provided back from the directional circuit 2016 to the generator 2012.

In the broad sense, the directional circuit 2014 is a loop circuit which includes one or more circuit elements causing the loop circuit to be asymmetric to current flow. Again it is important that the directional circuit 2014 has no continuous conductive path to earth ground, or a battery ground. As such, and as disclosed in FIG. 25 the directional circuit 2014 develops a DC potential across a load, such as resistor R1 in response to the alternating electric field. This DC potential is not referenced to ground but merely to the potential differences created by the circulation of current (see FIG. 26) in the loop across the load (resistor R1 of FIG. 25). Accordingly, the DC potential is self referencing. As far as the resistor R1 is concerned, circuit 2010 presents it with a relatively higher DC potential output at 2020 and a relatively lower potential output at 2022.

Figure 26:
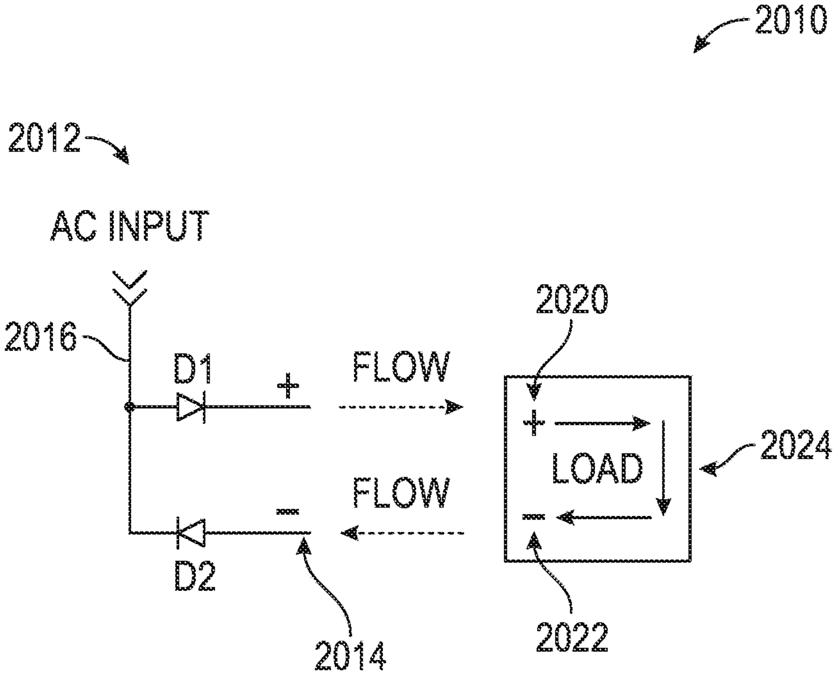
FIG. 26 shows a schematic view of a preferred embodiment of the invention.

FIG. 26 discloses circuit 2010 with the load represented as a generic load 2024 (rather than resistor R1) to show the circulation path of current flow (indicated by the arrows) in any generic load circuit utilizing the DC potential of circuit 2010.

FIGS. 25 and 26 disclose that the loads connected to the directional circuit 2014 do not have a continuous conductive path to earth ground or a battery ground. They also disclose that the directional circuit 2014 has circuit elements causing the directional circuit to be asymmetric to current flow. In the preferred embodiment disclosed, these circuit elements are diodes D1 and D2, However, it is contemplated that numerous other circuit elements could provide the same functionality, in particular, semiconductors with "pn" junctions; electrets, plasma, organic; or combinations thereof.

Figure 27:
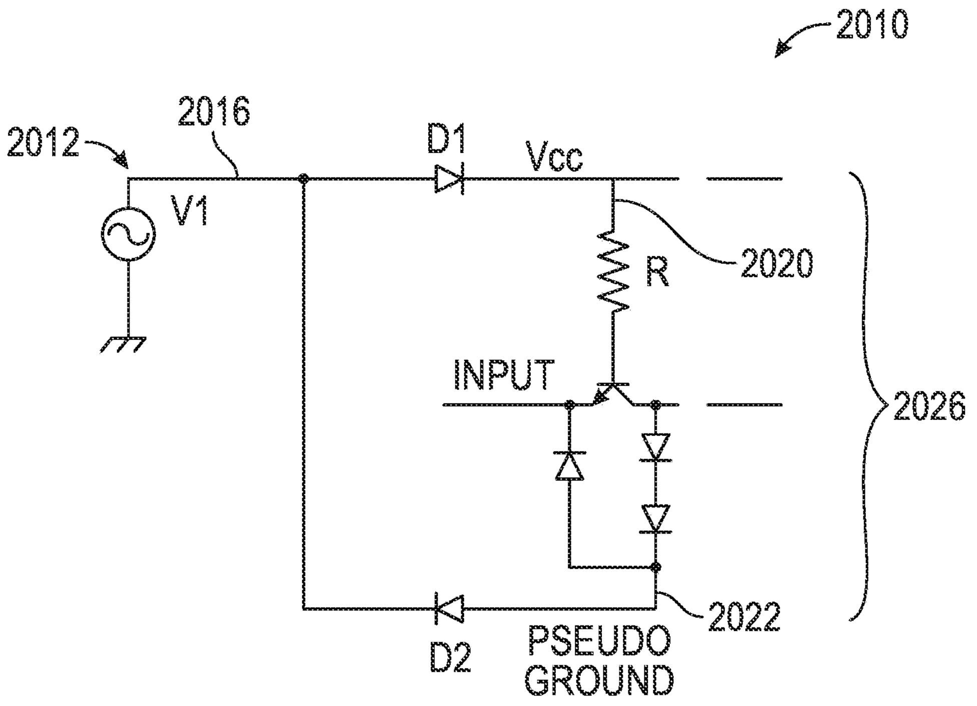
FIG. 27 shows a schematic view of a preferred embodiment of the invention.

The circuit 2010 is preferably used for delivering power and sensing proximity. The circuit 2010 is also preferably useful in TTL logic applications as disclosed in FIG. 27 showing a standard TTL logic output circuit 2026 powered by circuit 2010. In that application, the DC voltages necessary range from 0V to +/−5V.

FIGS. 25-27 each disclose that directional circuit 2014 includes first and second diodes D1 and D2, with D1 having an anode and diode D2 having a cathode which are commonly connected to the transmission conductor 2016. the cathode of the first diode D1 is connected to the relatively more positive side of the load 2020 while the anode of the second diode is connected to the relatively less positive side load 2022 to form the directional loop circuit among the diodes and the load.

Figure 28:
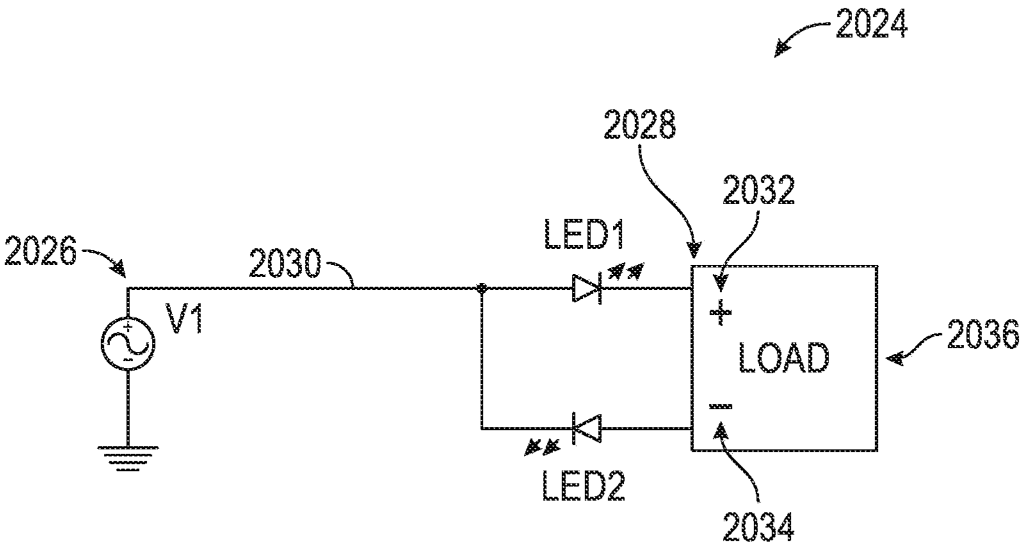
FIG. 28 shows a schematic view of a preferred embodiment of the invention.
Figure 36:
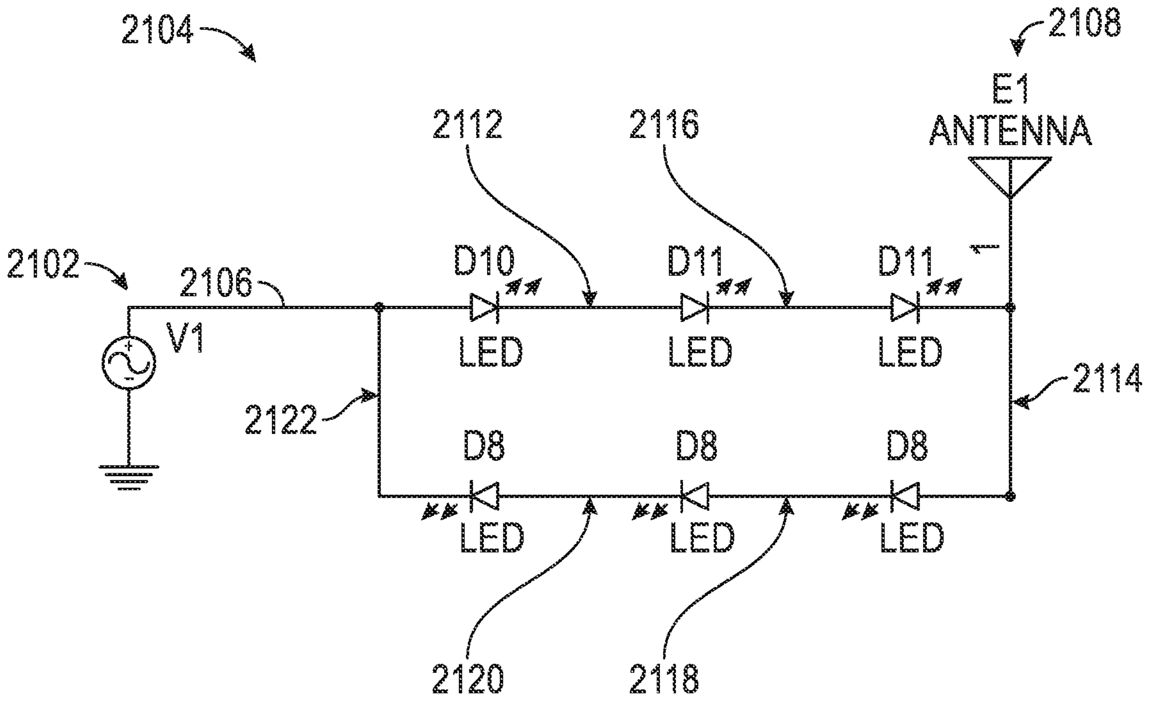
FIG. 36 shows a schematic view of a preferred embodiment of the invention.

FIG. 28 discloses a circuit 2024 according to the invention having a standard AC signal generator 2026 and a directional circuit 2028 includes first and second light emitting diodes (LEDs), the first LED 1 has an anode and the second LED 2 has a cathode, which are commonly connected to the conductor 2030 from the generator 2026. The cathode of LED 1 is connected to the relatively more positive voltage side 2032 of the load 2036 while the anode of LED 2 is connected to the relatively less positive side 2034 of the load 2036 to form the loop circuit 2028 among the LEDs 1 and 2. In this embodiment the load is configured to optimize the lumen produced by the directional circuit, for example the LEDs 1, 2 used to deliver power to the load 2036 which can be a third LED as shown in FIG. 36.

Figure 29:
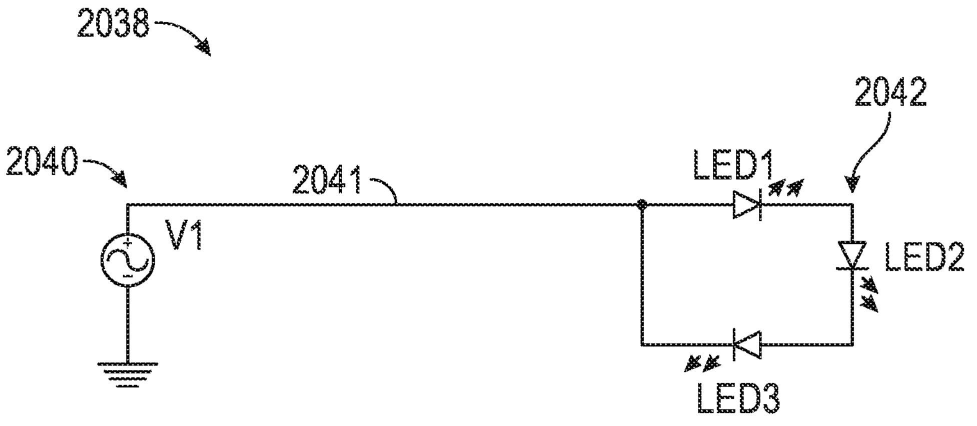
FIG. 29 shows a schematic view of a preferred embodiment of the invention.
Figure 30:
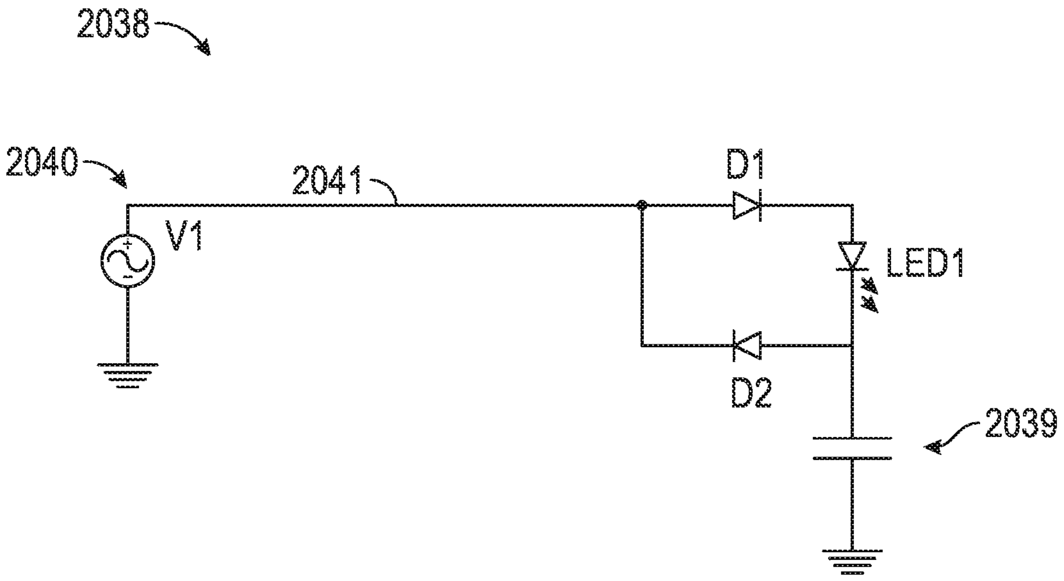
FIG. 30 shows a schematic view of a preferred embodiment of the invention.

FIG. 29 discloses a circuit 2038 according to the invention. In this embodiment, a generator 2040 produces an alternating electric field on transmission conductor 2040. The conductor 2041 is connected to a directional circuit 2042 having circuit elements causing an asymmetrical response to the alternating field and current flow. In particular, circuit 2042 includes three LEDs 1, 2, 3, configured to provide circulation according to the direction of the arrows (see FIG. 29). In this embodiment, all three LEDs 1-3 provide light as an output that can be considered as a load. This shows that relative nature of the positioning of elements in the various directional circuits disclosed herein according to the invention. If light is desired, then each of the diodes may be considered both loads and circuit elements which cause asymmetrical current flow. For example, FIG. 30 discloses the same circuit 2038 with only the substitution of LEDs 1 and 3 by diodes D1 and D2. In this circuit, optimization of the light emitted by LED 2 is of paramount concern, whereas the diodes 1, 2 provide directionality and a DC offset to the AC signal source as will be disclosed in more detail below. In preferred embodiments, the directional circuits, including directional circuit 2014, disclosed herein throughout this invention may be connected to ground through capacitance 2039 at a point within the directional circuit other than the AC signal input point 28 as shown in FIG. 30. This ground connection seems to provide increased circulation current, as it is noted that the LEDs get brighter for a given alternating electromagnetic source. The capacitor 2039 may alternatively be placed on the other side of the AC line 2041. The capacitor is used to drop the voltage from the AC source.

Figure 31:
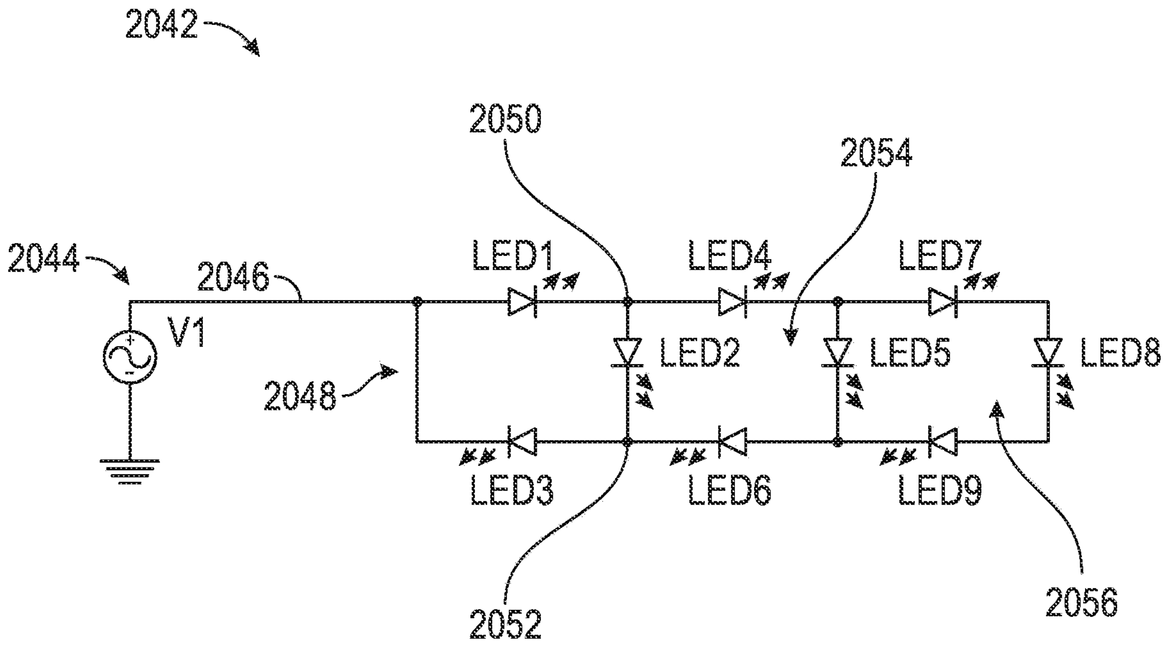
FIG. 31 shows a schematic view of a preferred embodiment of the invention.

FIG. 31 discloses a circuit 2042 having an AC signal generator 2044 inducing an alternating electric field onto transmission conductor 2046 which is connected to a first directional circuit 2048 having LEDs 1-3. LED 2 acting as a load to circuit 2048, provides the relatively high DC potential at point 2050 and a relatively lower DC potential at point 2052 to another directional circuit 2054 comprised of LEDs 4-6. This is repeated for another directional circuit 2056 and LEDs 7-9. Again, the circuit components LEDs 1-9 provide both directionality and useful work as a load in the form of producing light. According to another aspect of the invention, the circuit 2042 discloses the multiplexing possibilities of the directional circuits 2048, 2052, 2056. According to another aspect of the invention, the circuit 2042 discloses a parallel LED directional circuit.

Figure 32:
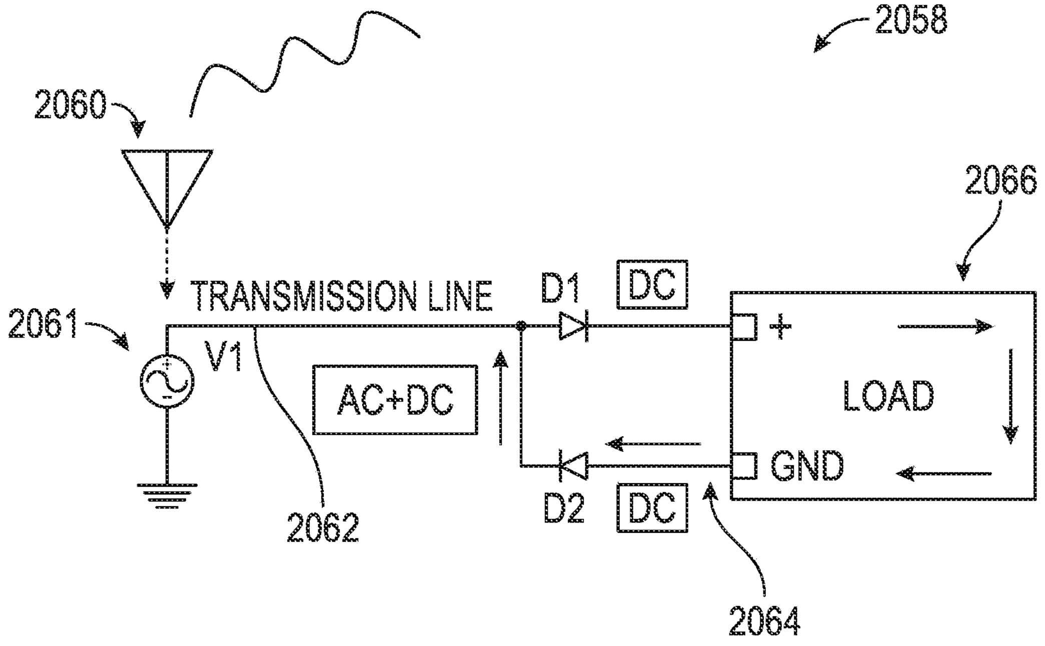
FIG. 32 shows a schematic view of a preferred embodiment of the invention.

FIG. 32 discloses a circuit 2058 to illustrate another aspect of the invention, in particular the transmission of information or data as one may use the terms. Accordingly, the alternating electric field is provided (as it could be with any embodiment disclosed herein) by either an antenna 2060 or a signal generator 2061. The alternating signal source is imposed on transmission conductor 2062. A directional circuit 2064 is comprised of a load 2066 and two diodes D1 and D2. The circuit 2058 discloses the directional DC current flow as well as an AC plus DC current flow and potential indicated by "AC+DC" in FIG. 32. This DC plus AC component is important to the transmission of information or data signals from the generators 2060, 2061.

Figure 33:
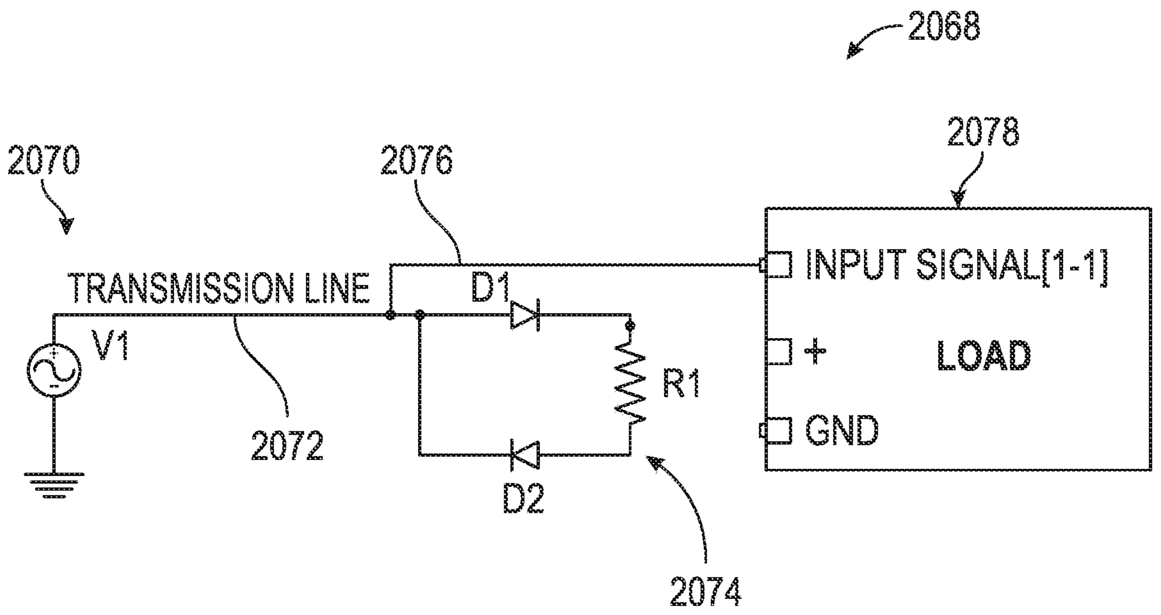
FIG. 33 shows a schematic view of a preferred embodiment of the invention.

In particular, FIG. 33 discloses a circuit 2068 having a signal generator 2070, a transmission conductor 2072, and a directional circuit 2074. The directional circuit has asymmetrical diode elements D1 and D2 and a load R1. In this and the other embodiment disclosed herein (see FIG. 32), the directional circuit 2074 is constructed to permit a DC voltage level to accrue on the transmission conductor 2072 along with the AC signal to provide an offset to the signal. This offset is preferential to the signal as the signal is ungrounded. It is believed that this may prevent noise in the system to be added to the line 2072 as a second alternating field but with reference to ground. Accordingly the noise adds to the DC level but not to the signal level in the same proportions.

Also as disclosed in FIG. 33, an output 2076 is provided which will transmit the AC signals from transmission line 2072 to an information or data signal receiver 2078 which will detect the signal riding the DC level. The DC level can easily be distinguished and handled by such a receiver as is conventional. It should be understood that the signal receiver 2078 may be of any conventional type of TTL logic device, modem, or telecommunications receiver and is believed to operate best with the preferred systems of the invention when it is not connected to earth ground or a battery ground, or a current sink or charge collector (as is the case for the working loads disclosed through out this disclosure).

Figure 34:
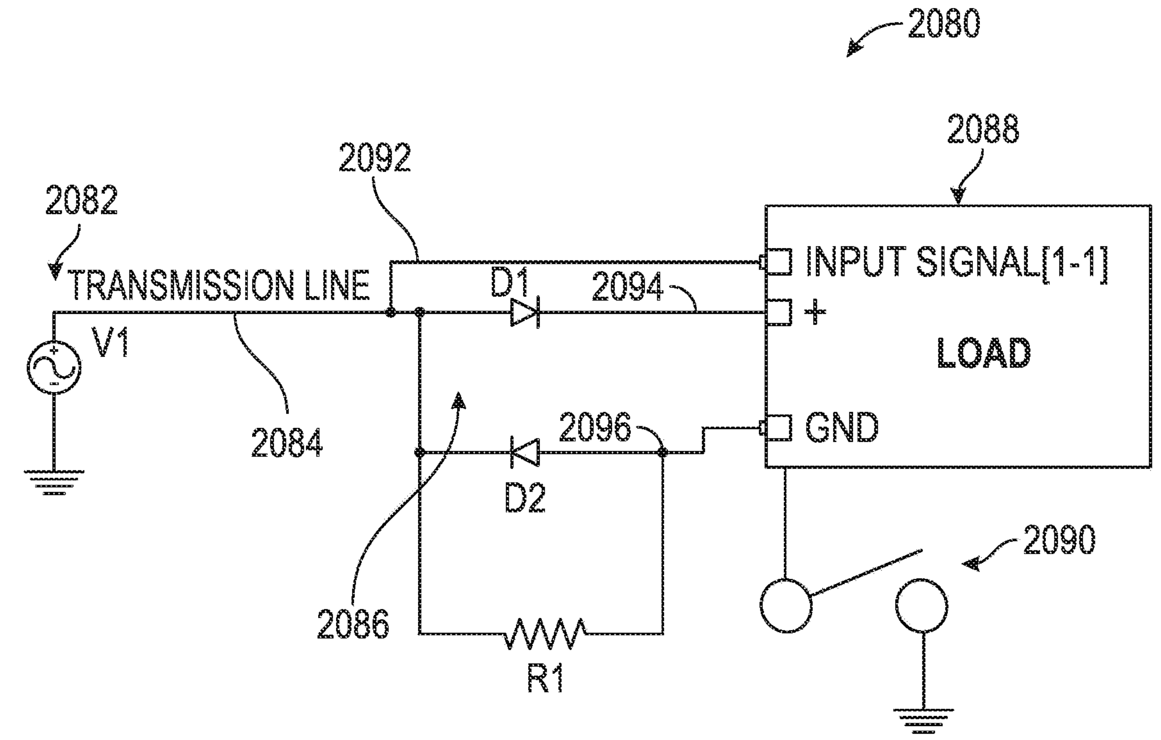
FIG. 34 shows a schematic view of a preferred embodiment of the invention.

According to another embodiment, FIG. 34 discloses another information or data communication circuit 2080. The circuit 2080 includes a signal generator 2082, a transmission conductor 2084, a directional circuit 2086, a data receiver 2088, and a ground switch 2090. In this embodiment, the directional circuit 2086 provides both the DC power for the receiver 2088, and a data signal through output 2092 connected between the receiver input and the common connection between the conductor 2084 and directional circuit input to anode of diode D1 and cathode D2. In the meantime, the receiver is powered on the DC potential difference between the relatively more positive side 2094 and D2 the relatively less positive side 2096 of the directional circuit. In this embodiment, resistor R1 is provided according to another aspect of the invention to regulate or select as desired the level of DC offset the AC data signal will have at line 2092.

According to another aspect of the invention, the ground switch 2090 is provided to provide a non-continuous connection to a circuit, such as the ground circuit disclosed in FIG. 34, to dissipate excessive accumulations of charge or voltage potentials in the circuit 2080. It is contemplated that the switch 2090 be actuated based upon a timing (such as a pre-selected clock pulse) criteria, or by a sensor (not shown) of an undesirable DC level developing in the circuit 2080.

Once engaged, the circuit 2090 would dissipate the excess energy to a ground, ground, plane, capacitor, battery ground, or the like.

Figure 35:
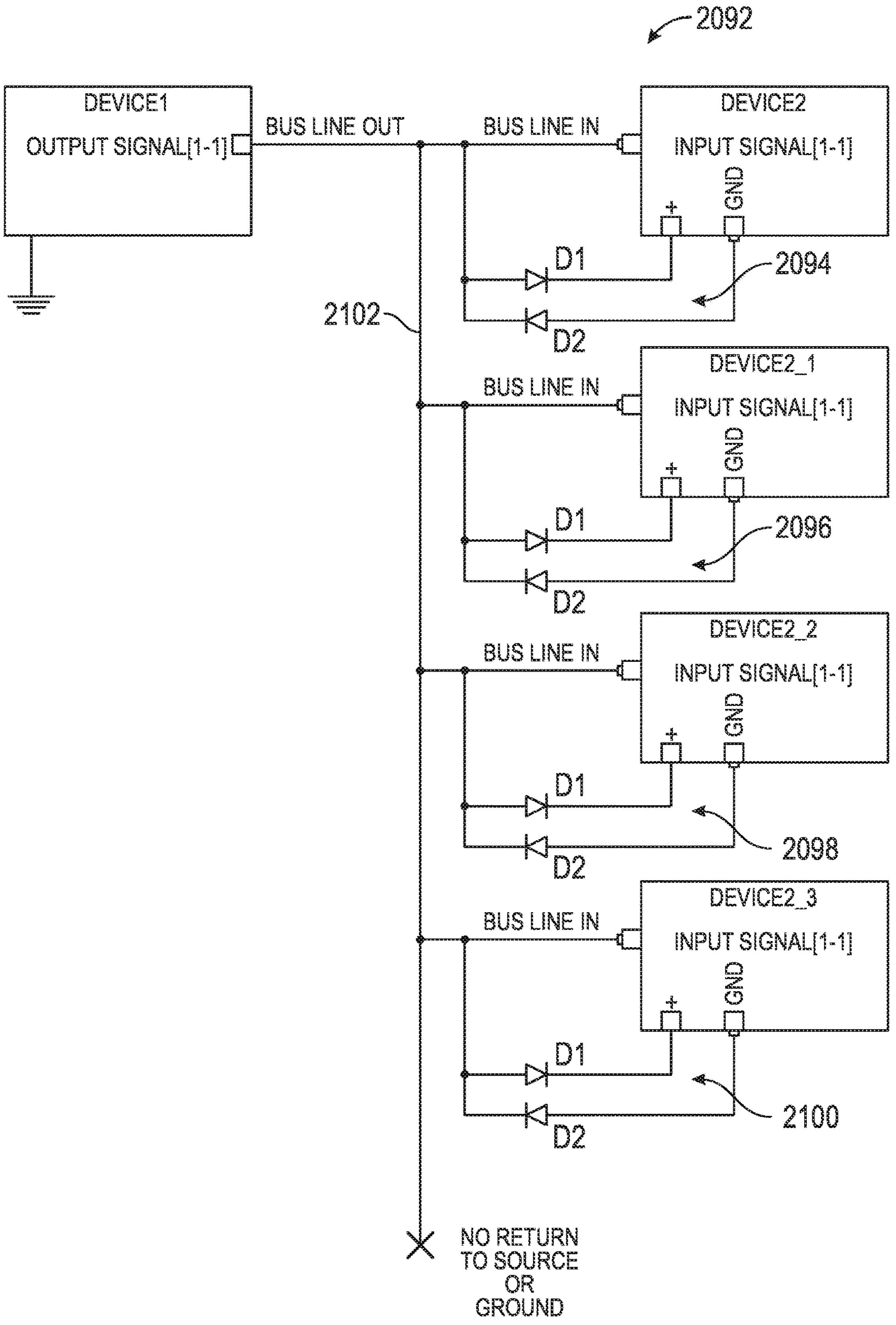
FIG. 35 shows a schematic view of a preferred embodiment of the invention.

FIG. 35 discloses a circuit 2092 wherein directional circuits 2094-2100 are connected through a common bus conductor 2102 to provide DC power and signals from generator 2104 as described previously herein.

Figure 37:
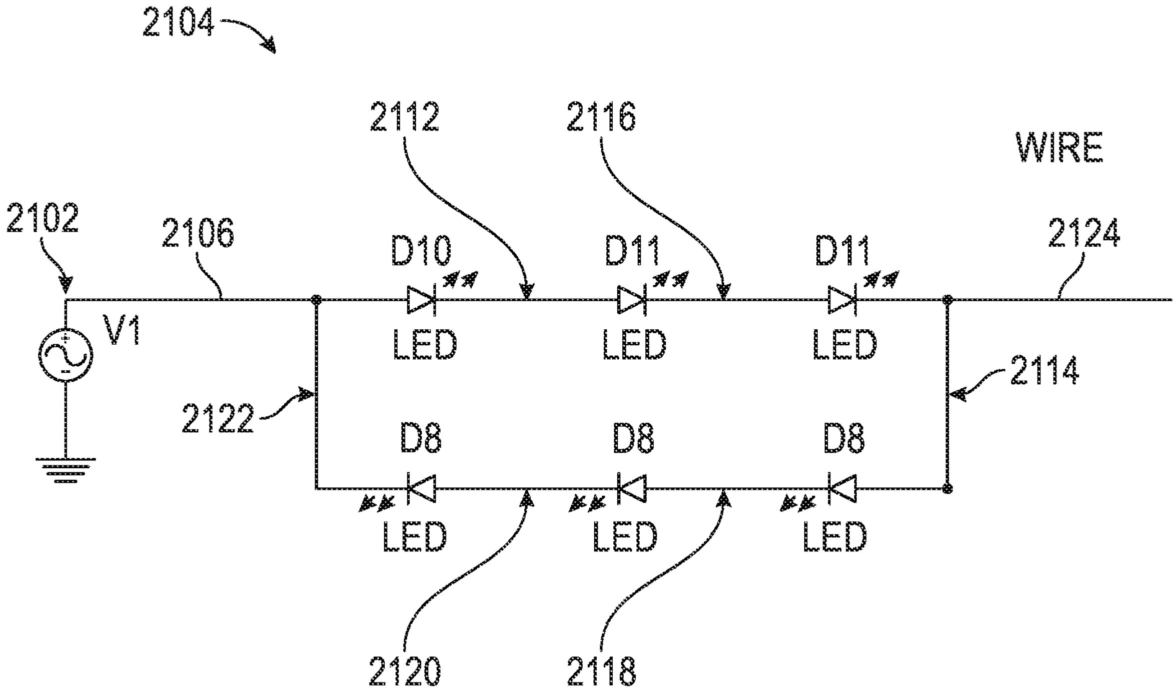
FIG. 37 shows a schematic view of a preferred embodiment of the invention.

FIGS. 36 and 37 disclose a circuit 2104 to illustrate another aspect of the invention. Accordingly, an alternating electric field is provided to a first transmission conductor by a signal generator 2102 and a second transmission conductor is provided by an antenna 2108 (see FIG. 36) or wire 2124 (see FIG. 37) that is connected to a relatively less positive side 2114-2122 within the directional circuit 2110. A difference in DC potential between a relatively more positive side 2112 within the directional circuit, and relatively less positive side 2114-2122 is provided. Another aspect of the invention is sensing proximity with impedance changes within the directional circuits described herein (as it could be with any embodiment disclosed herein) by approaching any of the directional circuits or transmission conductors (also any of which are described herein), for example approaching 2108 (shown in FIG. 36) and/or 2124 (as shown in FIG. 37) with a conductive substance such as a person or metallic material thereby changing the circulation of current flow within the directional circuit by changes in impedance through the capacitance of the conductive substance.

Figure 38:
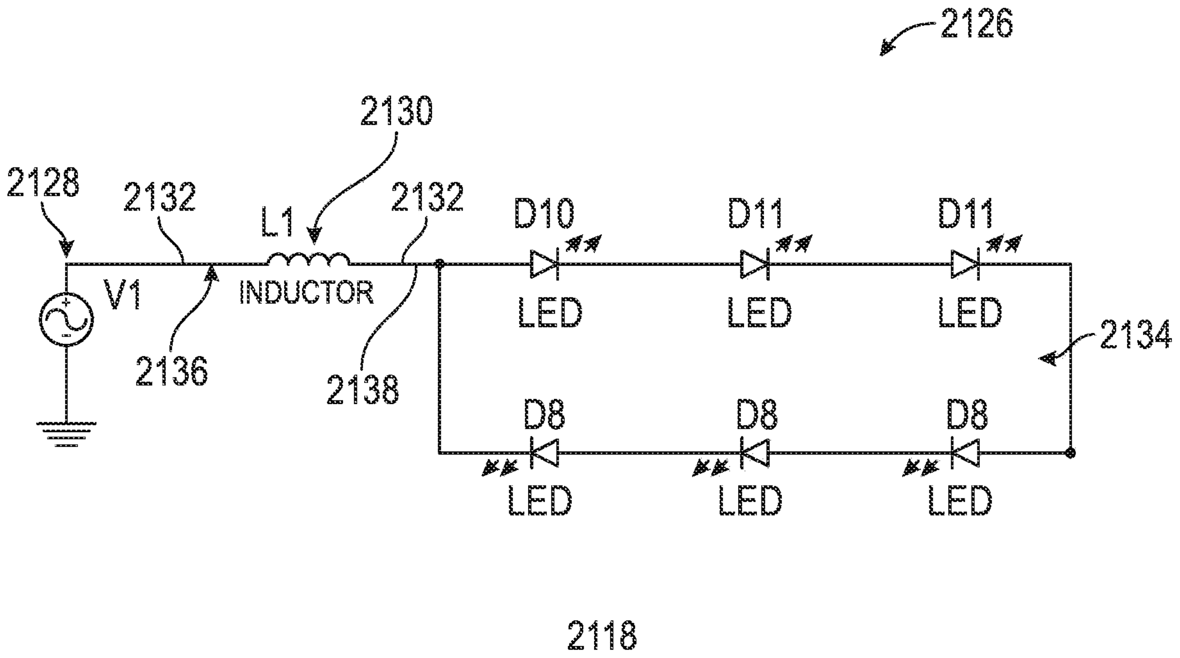
FIG. 38 shows a schematic view of a preferred embodiment of the invention.

FIG. 38 discloses a circuit 2126 to illustrate another aspect of the invention. Accordingly, an alternating electric field is provided to a transmission conductor 2132 by a signal generator 2128 that provides a first voltage level output equal to that provided by the signal generator 2128. A lump inductance 2130 is provided in series of the transmission conductor 2132 between the signal generator 2128 and directional circuit 2134. The lump inductance 2130 provides an increased voltage level from the relatively lower voltage on the transmission conductor 2132 at the point 2136 between the signal generator 2128 and lump inductance 2136 and a relatively higher voltage level on the transmission conductor 2132 at the point 2138 between the lump inductance 2130 and the directional circuit 2134 thereby providing an increase in current flow within the directional circuit 2134 or electromagnetic field energy radiating from the circuit 2126. The amount of current flow within the directional circuits described herein and electromagnetic field energy external of the directional circuits described herein is dependent on the frequency of an AC signal provided to the transmission conductor 2132 (or any of which are described herein). In preferred embodiments, the circuits disclosed in FIGS. 25-38 may be connected to ground through capacitance. This ground connection seems to provide increased circulation current, as it is noted that the LEDs get brighter for a given alternating electromagnetic source.

Figure 39:
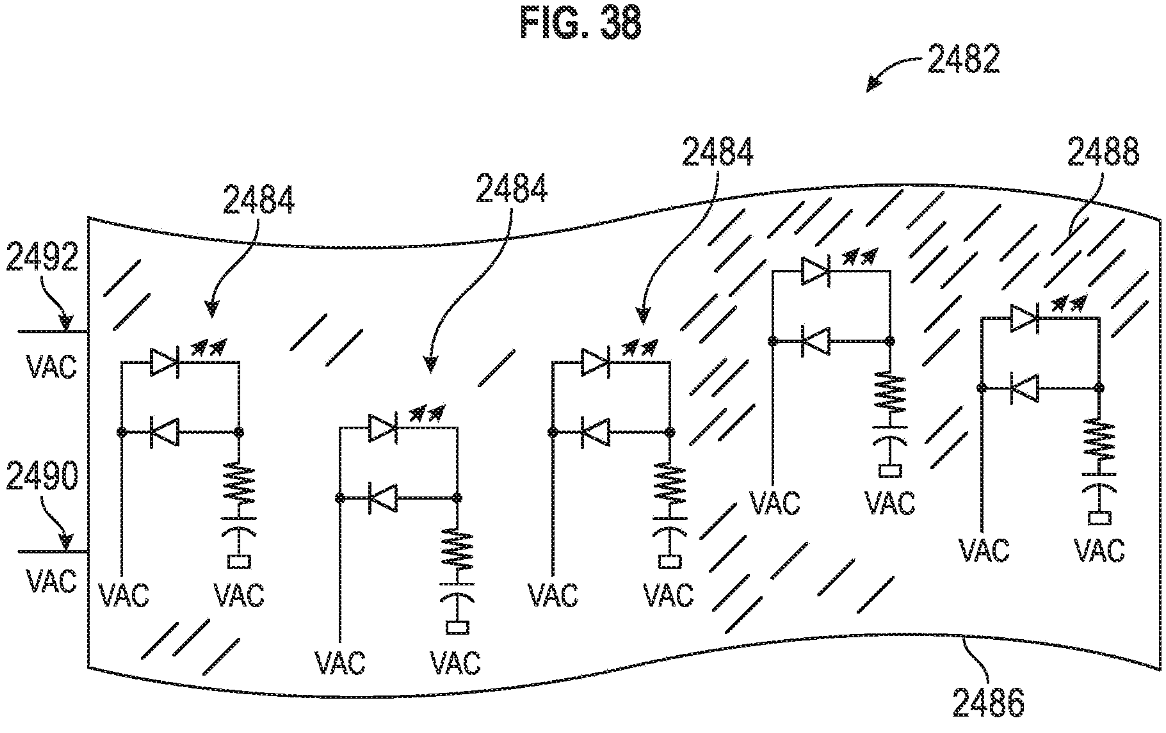
FIG. 39 shows a schematic view of a preferred embodiment of the invention.

FIG. 39 shows a device 2482 comprising individual light emitting diode circuits 2484 on a flexible printed circuit board having a mirror like reflective material or coating 2488 designed into or on the flexible printed circuit board in an area at least near the light emitting diodes for providing more efficient light output from the circuit board areas surrounding the light emitting diodes by having the flexible printed circuit board reflect light rather than absorb it. Power connection points 2490 and 2492 are provided to the board.

Figure 40:
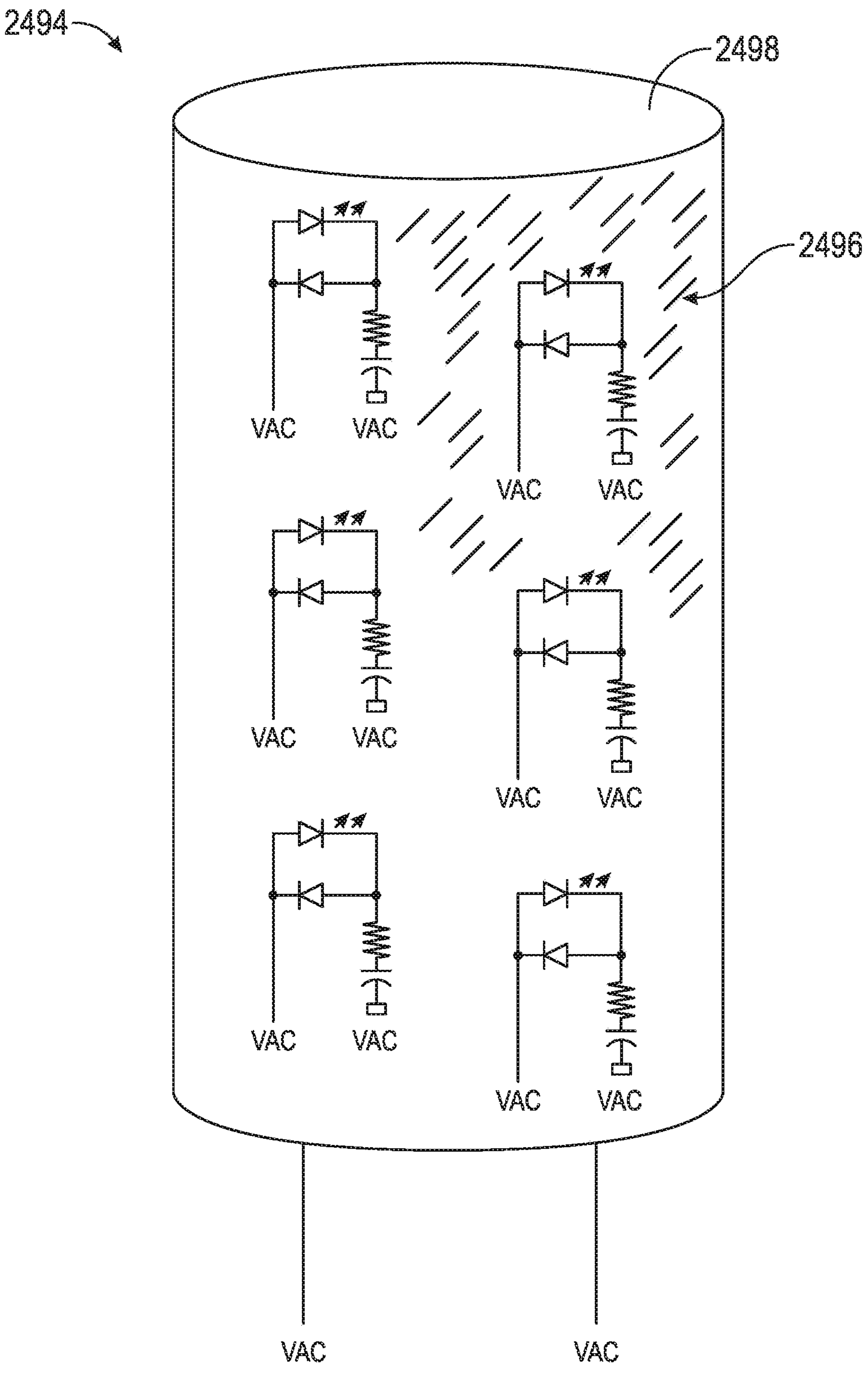
FIG. 40 shows a schematic view of a preferred embodiment of the invention.

FIG. 40 shows a device 2494 comprising a device 2496 identical to the device shown in FIG. 39 adhered to a device 2498 having a cylindrical shape for providing improved uniformity and increased angle of light output from device 2496.

It is to be understood that additional embodiments of the invention described herein may be contemplated by one of ordinary skill in the art, and the scope of the present invention is not limited to the embodiments disclosed. While specific embodiment s of the present invention have been illustrated described, numerous modifications come to mind without significantly departing from the spirit of the invention, and the scope of protection is only limited by the scope of the accompanying claims.

What is claimed is:

1. A lighting device for connection to an AC power source, the lighting device comprising:

at least one light emitting diode ("LED") circuit having a plurality of phosphor coated LEDs, wherein the plurality of phosphor coated LEDs are configured to emit a same or different colors of light;

a power source adaptor electrically coupled to the AC power source;

a driver including at least one bridge rectifier, the driver configured to receive an AC voltage from the power source adaptor and provide an output voltage to the at least one LED circuit;

a circuit for sensing an output of the driver, the circuit configured to electrically decouple the driver after detecting the output voltage of the driver is outside a predetermined voltage range; and a housing including a reflective material or coating.

2. The lighting device of claim 1, further comprising a lens.

3. The lighting device of claim 1, further comprising a 3-way switch.

4. The lighting device of claim 3, wherein the 3-way switch is controllable by a user to change a color or a brightness of the same or different colored LEDs.

5. The lighting device of claim 1, further comprising a data communication circuit configured to at least one of send or receive data via at least one of a transmission conductor or an antenna.

6. The lighting device of claim 1, further comprising a data communication circuit configured to transmit data signals to or receive data signals from at least one telecommunications device, the at least one telecommunications device including a circuit configured to detect human touch via capacitive sensing.

7. The lighting device of claim 1, wherein the lighting device is coupled to a dimmer that is configured to cause the at least one LED circuit to dim the plurality of phosphor coated LEDs.

8. A lighting device for connection to an AC power source, the lighting device comprising:

at least one light emitting diode ("LED") circuit having a plurality of phosphor coated LEDs, wherein the plurality of phosphor coated LEDs are configured to emit a same or different colors of light;

a removable power source adaptor electrically coupled to the AC power source;

a driver including at least one bridge rectifier, the driver configured to receive an AC voltage from the power source adaptor and provide an output voltage to the at least one LED circuit; and a circuit for sensing an output of the driver, the circuit configured to electrically decouple the driver after detecting the output voltage of the driver is outside a predetermined voltage range.

9. The lighting device of claim 8, further comprising a housing including a reflective material or coating, wherein the driver and the at least one LED circuit are mounted to the housing.

10. The lighting device of claim 9, further comprising a lens, wherein the lens is mounted to the housing.

11. The lighting device of claim 8, further comprising a data communication circuit configured to transmit data signals to or receive data signals from at least one telecommunications device, the at least one telecommunications device including a circuit configured to detect human touch via capacitive sensing.

12. The lighting device of claim 8, further comprising a 3-way switch.

13. The lighting device of claim 12, wherein the 3-way switch is controllable by a user to change a color or a brightness of the same or different colored LEDs.

14. The lighting device of claim 8, further comprising a circuit configured to sense a proximity of a person or an object.

15. The lighting device of claim 8, wherein the LED lighting device is electrically coupled to a dimmer that is configured to cause the at least one LED circuit to dim the plurality of phosphor coated LEDs.

16. A lighting device for connection to an AC power source, the lighting device comprising:

at least one light emitting diode ("LED") circuit having a plurality of phosphor coated LEDs, wherein the plurality of phosphor coated LEDs are configured to emit a same or different colors of light;

a power source adaptor electrically coupled to the AC power source;

a driver configured to receive an AC voltage from the power source adaptor and provide an output voltage to the at least one LED circuit; and a circuit for sensing an output of the driver, the circuit configured to cause the driver to be decoupled from the at least one LED circuit after detecting the output voltage of the driver is outside a predetermined voltage range.

17. The lighting device of claim 16, further comprising:

a housing including a reflective material or coating; and a lens, wherein the driver, the lens, and the at least one LED circuit are mounted to the housing.

18. The lighting device of claim 16, further comprising a data communication circuit configured to transmit data signals to or receive data signals from at least one telecommunications device, the at least one telecommunications device including a circuit configured to detect human touch via capacitive sensing.

19. The lighting device of claim 16, further comprising a 3-way switch.

20. The lighting device of claim 19, wherein the 3-way switch is controllable by a user to change a color or a brightness of the same or different colored LEDs.

* * * * *